(12) United States Patent
Yamamura et al.

(10) Patent No.: US 11,082,281 B2
(45) Date of Patent: Aug. 3, 2021

(54) RELAY COMMUNICATION METHOD AND RELAY COMMUNICATION DEVICE

(71) Applicant: FUJITSU LIMITED, Kawasaki (JP)

(72) Inventors: Shinya Yamamura, Fukuoka (JP); Tadakatsu Nagao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 235 days.

(21) Appl. No.: 15/925,160

(22) Filed: Mar. 19, 2018

(65) Prior Publication Data
US 2018/0287853 A1 Oct. 4, 2018

(30) Foreign Application Priority Data

Mar. 28, 2017 (JP) .............................. JP2017-062657

(51) Int. Cl.
| | | |
|---|---|---|
| *H04L 29/08* | (2006.01) |
| *H04L 12/911* | (2013.01) |
| *H04L 12/805* | (2013.01) |
| *H04L 12/851* | (2013.01) |
| *H04L 29/06* | (2006.01) |
| *H04L 12/927* | (2013.01) |

(52) U.S. Cl.
CPC .... *H04L 29/08954* (2013.01); *H04L 47/2433* (2013.01); *H04L 47/36* (2013.01); *H04L 47/821* (2013.01); *H04L 47/803* (2013.01); *H04L 69/162* (2013.01)

(58) Field of Classification Search
CPC .............................. H04L 47/821; H04L 47/36
USPC ..................................................... 709/226, 26
See application file for complete search history.

(56) References Cited

U.S. PATENT DOCUMENTS

| | | | | |
|---|---|---|---|---|
| 2010/0165846 A1* | 7/2010 | Yamaguchi | ........ | H04B 7/15592 370/236 |
| 2010/0265951 A1 | 10/2010 | Fujita et al. | | |
| 2013/0040557 A1* | 2/2013 | Shiizaki | ............. | H04B 7/15557 455/7 |
| 2013/0195004 A1* | 8/2013 | Hampel | .................. | H04L 69/16 370/315 |
| 2013/0329560 A1* | 12/2013 | Shomura | ........... | H04W 28/0247 370/235 |

FOREIGN PATENT DOCUMENTS

| | | |
|---|---|---|
| JP | 2008-205890 | 9/2008 |
| WO | 2009/078427 | 6/2009 |

OTHER PUBLICATIONS

Seligman, Matthew et al., "Alternative Custodians for Congestion Control in Delay Tolerant Networks", SIGCOMM'06 Workshops, Sep. 11-15, 2006, Pisa, Italy, Association for Computing Machinery, pp. 229-236.

Japanese Office Action dated Dec. 1, 2020 for corresponding Japanese Patent Application No. 2017-062657 with English Translation, 7 pages.

* cited by examiner

*Primary Examiner* — Sibte H Bukhari
(74) *Attorney, Agent, or Firm* — Fujitsu Patent Center

(57) ABSTRACT

A relay communication device includes a memory and a processor coupled to the memory and configured to: receive data from an application, and determine a relay path of each of a plurality of data received from the application according to a protocol of a disruption tolerant network based on data remaining amount to be relayed to a communication destination in response to receiving of new data of the application and a priority of each of the plurality of data.

11 Claims, 18 Drawing Sheets

FIG. 4

PRIMARY BUNDLE BLOCK

| 8bit | 16bit | 24bit | 32bit |
|---|---|---|---|
| Version | \multicolumn{3}{c}{Proc. Flags} | | |
| Block length | | | |
| Destination scheme offset | | Destination SSP offset | |
| Source scheme offset | | Source SSP offset | |
| Report-to scheme offset | | Report-to SSP offset | |
| Custodian scheme offset | | Custodian SSP offset | |
| Creation Timestamp time | | | |
| Creation Timestamp sequence number | | | |
| Lifetime | | | |
| Dictionary length | | | |
| Dictionary byte array | | | |
| [Fragment offset] | | | |
| [Total application data unit length] | | | |

BUNDLE PAYLOAD BLOCK

| 8bit | 16bit | 24bit | 32bit |
|---|---|---|---|
| Block type | Proc. Flags | Block length | |
| Bundle Payload | | | |

FIG. 5

CONNECTION LIST — 116, 216

| CONNECTION NUMBER | SOCKET CHANNEL ID | DESTINATION EID |
|---|---|---|
| . . . . . | . . . . . | . . . . . |

FILTER TABLE — 118, 128

| FILTER CONDITIONS | CONVERSION INFORMATION | SETTING STATE |
|---|---|---|
| . . . . . | . . . . . | . . . . . |

BUNDLE BUFFER — 122, 222

| BUNDLE ID | BUNDLE |
|---|---|
| . . . . . | . . . . . |

TRANSMISSION EVENT QUEUE — 126, 226

| ID | TRANSMISSION DESTINATION ADDRESS | SIZE |
|---|---|---|
| 1 | 192.168.1.1:8001 | . . . . |
| 2 | 192.168.1.2:8002 | . . . . |

RECEPTION EVENT QUEUE — 126, 226

| ID | TRANSMISSION DESTINATION ADDRESS | SIZE |
|---|---|---|
| 1 | 192.168.1.1:8001 | . . . . |
| 2 | 192.168.1.2:8002 | . . . . |

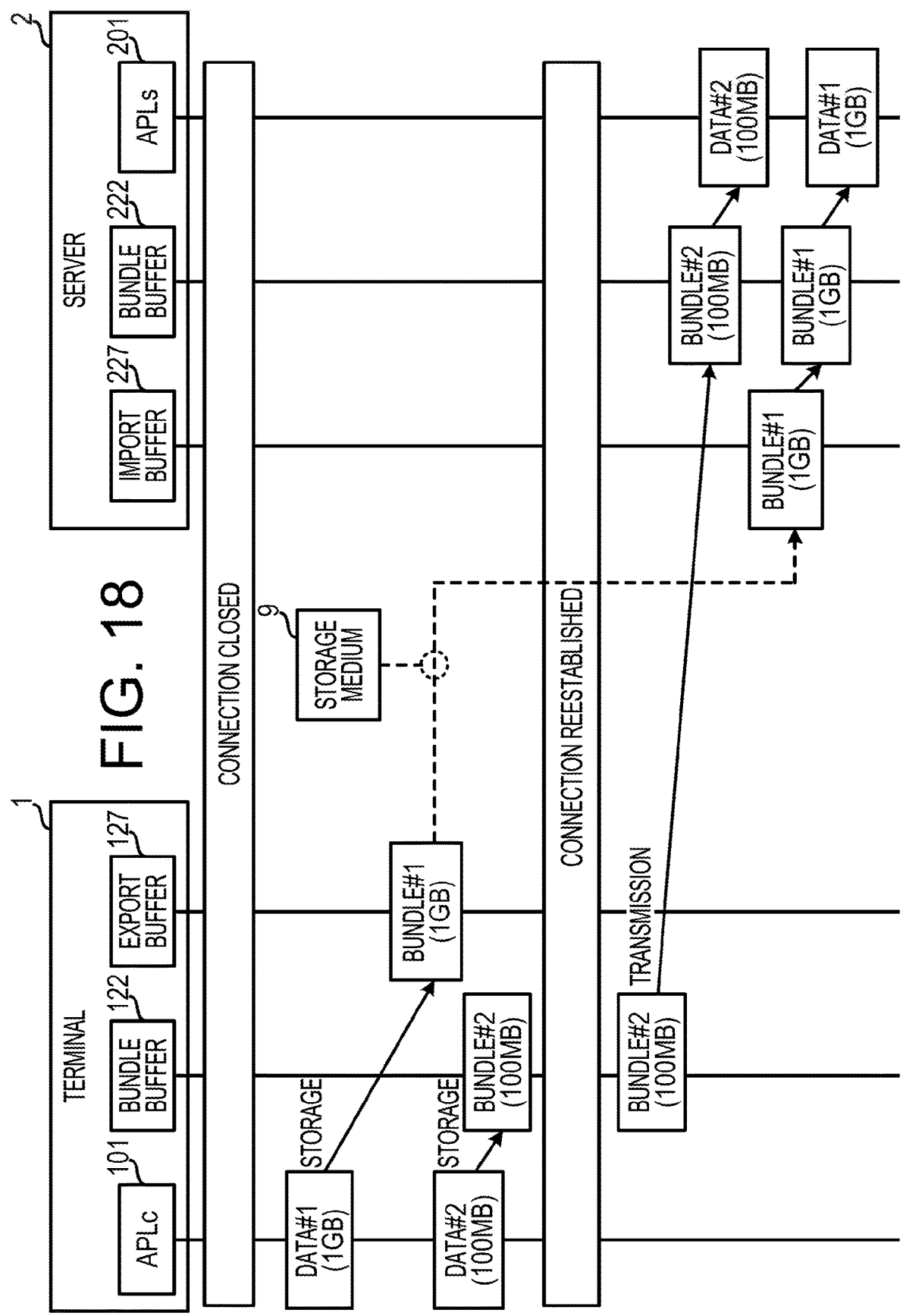

RELAY COMMUNICATION METHOD AND RELAY COMMUNICATION DEVICE

CROSS-REFERENCE TO RELATED APPLICATION

This application is based upon and claims the benefit of priority of the prior Japanese Patent Application No. 2017-062657, filed on Mar. 28, 2017, the entire contents of which are incorporated herein by reference.

FIELD

The embodiments discussed herein are related to a relay communication method, a computer-readable recording medium having stored therein a relay communication program, and a relay communication device.

BACKGROUND

In recent years, with the distribution of wireless access points (hereinafter referred to as "APs"), a communication style of a terminal such as smartphones in which communication is performed while switching over the wide area wireless connections between the Aps and communication carriers is spreading. In such circumstances, since a communication state is affected by the number of connections of the terminals and surrounding radio wave conditions, the communication quality varies depending on place and time, which may cause an intermittent communication.

For example, when a user is moving and communicating with a server on the Internet while switching an AP to be linked, when the amount of communication data is large and the staying time within a linkable range of the AP is short, the communication is disconnected halfway. Therefore, it is necessary to re-try the communication after re-linking with another AP.

In contrast, it has been studied to give tolerance to communication delay and disruption to an application of a terminal. For example, a disruption tolerant network (DTN) is known as a technology that enables a smooth communication even in an environment where communication is intermittent. This technology has been standardized by IETF (The Internet Engineering Task Force). For example, a bundle protocol to be applied to DTN is defined in RFC (Request For Comments) 5050.

Related technologies are disclosed in, for example, Japanese Patent Application Publication No. 2008-205890 and International Publication Pamphlet No. WO 2009/078427.

SUMMARY

According to an aspect of the embodiments, a relay communication device includes a memory and a processor coupled to the memory and configured to: receive data from an application, and determine a relay path of each of a plurality of data received from the application according to a protocol of a disruption tolerant network based on the data remaining amount to be relayed to a communication destination in response to reception of new data of the application and a priority of each of the plurality of data.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a view illustrating a format of a bundle;

FIG. 5 is a view illustrating an example of a connection list, a filter table, a bundle buffer, a transmission event queue and a reception event queue;

FIG. 18 is a sequence diagram illustrating an example of a transmission process of data having different sizes.

DESCRIPTION OF EMBODIMENTS

Originally, a bundle protocol is supposed to be applied to communications having no real-time property and assumes a delay in communications like communications under a special environment such as an outer space or underwater. Therefore, it is difficult to directly use the bundle protocol in general applications. For this reason, in order to use the bundle protocol for communication of the general applications, it is conceivable to use a proxy function to perform communication based on the bundle protocol.

A relay communication device having a proxy function receives and bundles data from an application, stores the bundled data in a buffer, and transmits the stored bundled data after restoration of communication, during communication disconnection. At this time, the transmission order of the bundled data matches the reception order from the application.

However, this transmission order may not be appropriate depending on the usage of the data. For example, in a case of transmission of data with high real-time property such as video data of a surveillance camera, when old video data is transmitted earlier than new video data in chronological order, confirmation of the new video is delayed on the receiving side, which may cause a trouble in surveillance.

In contrast, if the relay communication device discards the old video data, the new video data can be preferentially transmitted so that the trouble in surveillance can be prevented. However, the old video data may not be discarded because it may be used for analysis on the past videos.

Figure 1:
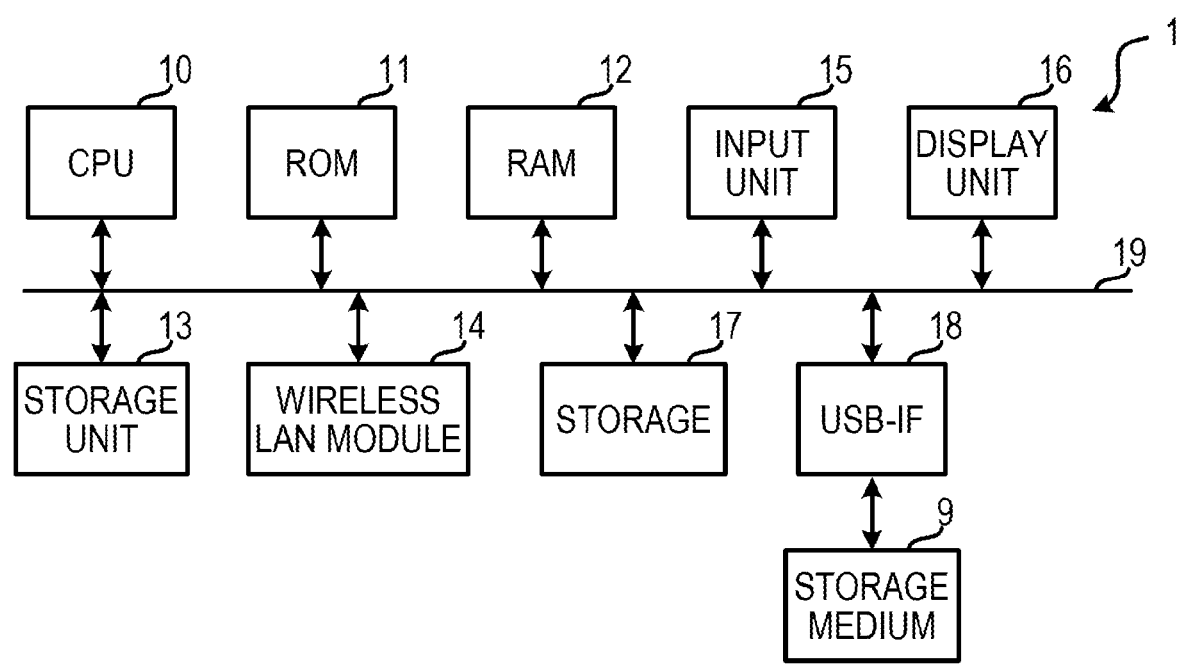
FIG. 1 is a block diagram illustrating an example of the configuration of a terminal.

FIG. 1 is a block diagram illustrating an example of the configuration of a terminal. The terminal 1 may be, but is not limited to, a communication terminal such as a smartphone or a personal computer.

The terminal 1 includes a CPU (Central Processing Unit) 10, a ROM (Read Only Memory) 11, a RAM (Random Access Memory) 12, a storage unit 13 such as a HDD (Hard Disk Drive), and a memory. The terminal 1 further includes a wireless LAN (Local Area Network) module 14, an input unit 15, a display unit 16, a storage 17 such as an HDD and an SSD (Solid State Drive), and a USB (Universal Serial Bus) interface (USB-IF) unit 18. The CPU 10 is connected to the ROM 11, the RAM 12, the storage unit 13, the wireless LAN module 14, the input unit 15, the display unit 16, the storage 17, and the USB-IF 18 via a bus 19 so that signals can be exchanged among them.

A program for driving the CPU 10 is stored in the ROM 11. The program in the ROM 11 includes a relay communication program for executing a relay communication method according to an embodiment.

The RAM 12 functions as a working memory of the CPU 10. The storage unit 13 stores various kinds of information used for executing a program. The USB-IF 18 processes communication with a storage medium 9 such as a USB memory under control from a driver of the CPU 10. The storage 17 has a data storage area (such as an export buffer to be described later) from/into which data can be read/written via the USB-IF 18.

The wireless LAN module 14 communicates with a server on the Internet, for example, by linking up with an AP connected to an access system network. The wireless LAN module 14 can link up with an AP through a plurality of communication lines.

The input unit 15 is a unit for inputting information to the terminal 1. Examples of the input unit 15 may include a keyboard, a mouse, a touch panel and the like. The input unit 15 outputs the input information to the CPU 10 via the bus 19.

The display unit 16 is a unit for outputting information of the terminal 1. Examples of the display unit 16 may include a display, a touch panel, a printer and the like. The display unit 16 acquires and displays information from the CPU 10 via the bus 19.

When the CPU 10 reads a program from the ROM 11, various functions for executing the relay communication method are formed. The CPU 10 is an example of a computer that executes a program. The functional configuration of the terminal 1 will be described later.

Figure 2:
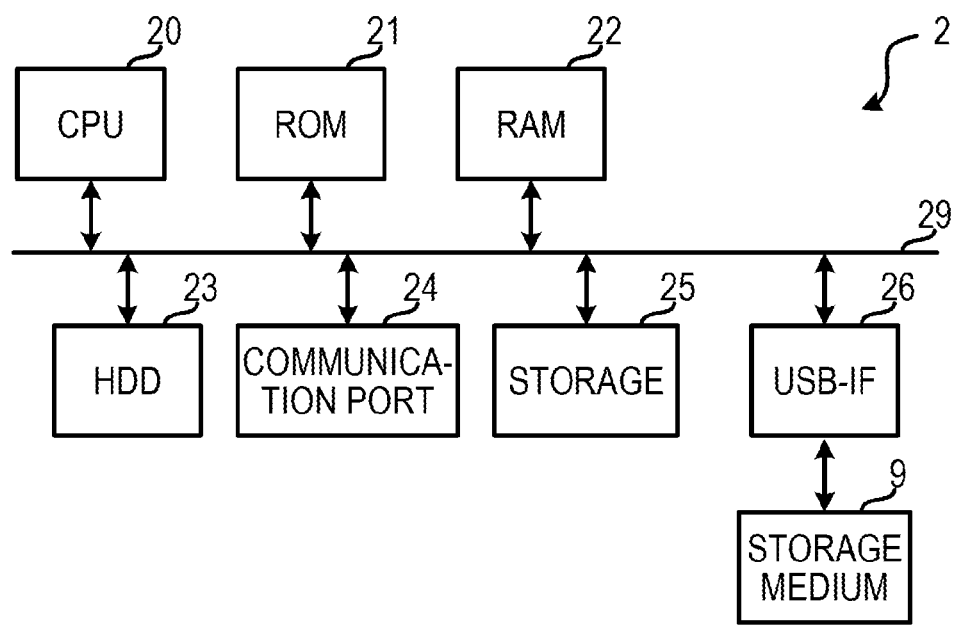
FIG. 2 is a block diagram illustrating an example of the configuration of a server.

FIG. 2 is a block diagram illustrating an example of the configuration of a server 2. The server 2 is, for example, a relay communication device which is connected to the Internet and provides a predetermined service by communicating with the terminal 1.

The server 2 includes a CPU 20, a ROM 21, a RAM 22, an HDD 23, a communication port 24, a storage 25, and a USB-IF 26. The CPU 20 is connected to the ROM 21, the RAM 22, the HDD 23, the communication port 24, the storage 25 such as HDD and SSD, and the USB-IF 26 via the bus 29 so that signals can be exchanged among them.

A program for driving the CPU 20 is stored in the ROM 21. The RAM 22 functions as a working memory of the CPU 20. The communication port 24 is, for example, an NIC (Network Interface Card) and communicates with the terminal 1 via the Internet.

The USB-IF 26 processes communication with a storage medium 9 such as a USB memory under control from a driver of the CPU 20. The storage 25 has a data storage area (such as an import buffer to be described later) from/into which data can be read/written via the USB-IF 26.

Figure 3:
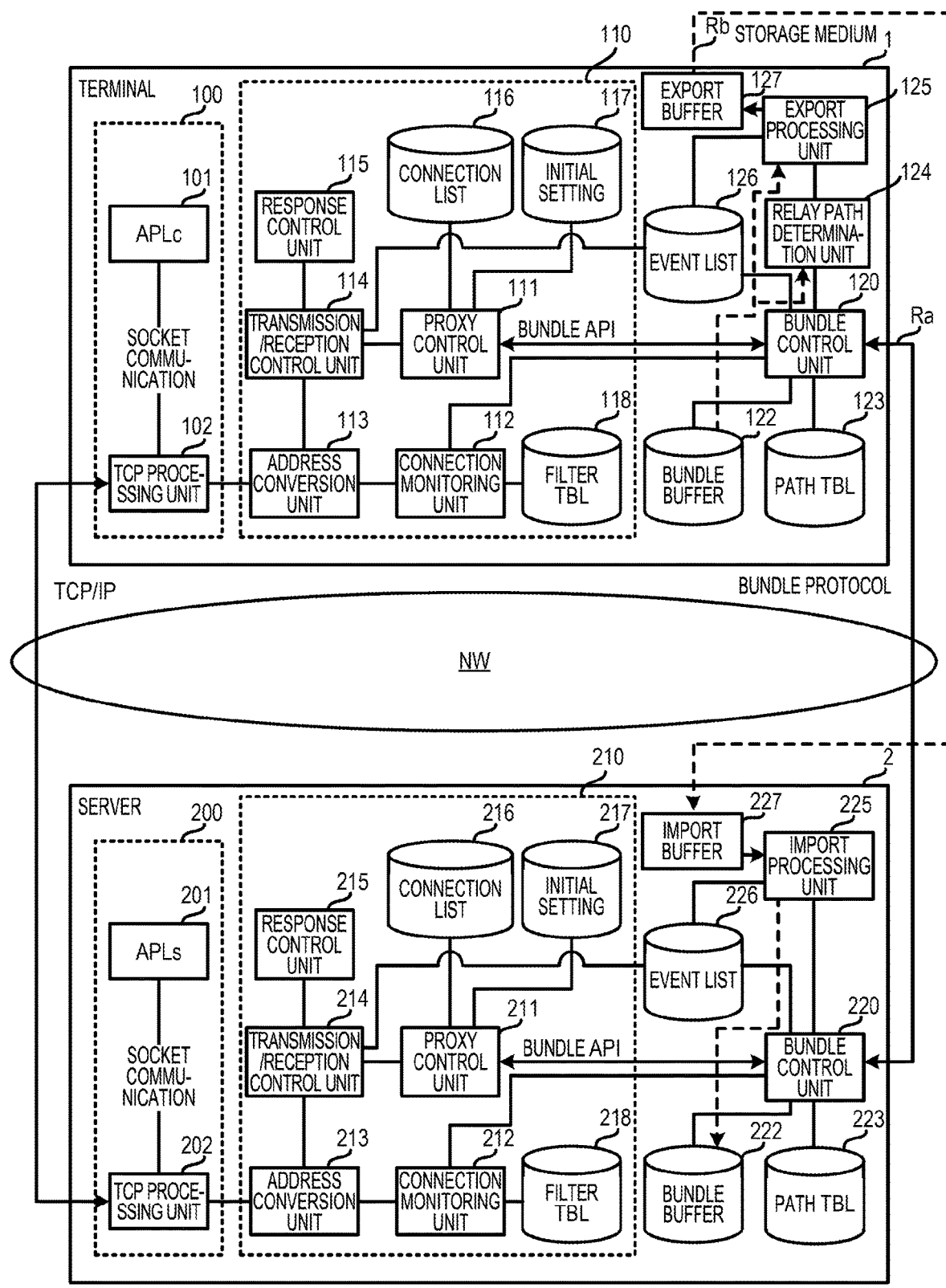
FIG. 3 is a view illustrating an example of the functional configuration of each of the terminal and the server.

FIG. 3 is a view illustrating an example of the functional configuration of each of the terminal 1 and the server 2. The terminal 1 and the server 2 are connected via a network NW.

The terminal 1 includes an application function unit 100, a proxy protocol function unit 110, a bundle control unit 120, a bundle buffer 122, a path table (path TBL) 123, a relay path determination unit 124, an export processing unit 125, an export buffer 127, and an event list 126.

The application function unit 100 includes a client application (APLc) 101 and a TCP (Transmission Control Protocol) processing unit 102. The proxy protocol function unit 110 includes a proxy control unit 111, a connection monitoring unit 112, an address conversion unit 113, a transmission/reception control unit 114, a response control unit 115, a connection list 116, an initial setting file 117, and a filter table (filter TBL) 118.

The client application 101, the TCP processing unit 102, the proxy control unit 111, the connection monitoring unit 112, the address conversion unit 113, the transmission/reception control unit 114, the response control unit 115, the bundle control unit 120, the relay path determination unit 124, and the export processing unit 125 are functions formed in the CPU 10 of the terminal 1. The connection list 116, the initial setting file 117, the filter TBL 118, the bundle buffer 122, the path TBL 123, and the event list 126 are formed in the storage unit 13, and the export buffer 127 is formed in the storage 17.

In the functional configuration of the terminal 1 illustrated in FIG. 3, the units except the application function unit 100 function as a relay communication device and a relay communication program according to an embodiment, and relay communication from the client application 101 to a communication destination. As illustrated in FIG. 3, the relay communication device and the relay communication program of the embodiment may be provided inside the terminal 1 but may be provided in a device different from the terminal 1.

In the meantime, the server 2 includes an application function unit 200, a proxy protocol function unit 210, a bundle control unit 220, a bundle buffer 222, an import processing unit 225, an event list 226, a path TBL 223, and an import buffer 227.

The application function unit 200 includes a server application (APLs) 201 and a TCP processing unit 202. The proxy protocol function unit 210 includes a proxy control unit 211, a connection monitoring unit 212, an address conversion unit 213, a transmission/reception control unit 214, a response control unit 215, a connection list 216, an initial setting file 217, and a filter TBL 218.

The server application 201, the TCP processing unit 202, the proxy control unit 211, the connection monitoring unit 212, the address conversion unit 213, the transmission/reception control unit 214, the response control unit 215, the bundle control unit 220, and the import processing unit 225 are functions formed in the CPU 20 of the server 2. The connection list 216, the initial setting file 217, the filter TBL 218, the bundle buffer 222, the path TBL 223, and the event list 226 are formed in the HDD 23, and the import buffer 227 is formed in the storage 25.

The server application 201 and the client application 101 communicate with each other by the TCP processing units 102 and 202 to provide predetermined functions in cooperation. The server application 201 and the client application 101 may include, but are not limited to, a file transfer function and a video data transfer function. The client application 101 is an example of an application recited in the present disclosure.

The TCP processing units 102 and 202 have a communication function of TCP/IP (Internet Protocol) provided by, for example, a driver of an OS (Operating System) or the like. The TCP processing unit 102 of the terminal 1 controls the wireless LAN module 14 to transmit and receive packets, and the TCP processing unit 202 of the server 2 controls the communication port 24 to transmit and receive packets.

The server application 201 and the client application 101 perform a direct communication based on TCP/IP via the network NW. However, in an environment in which communication is intermittent, the bundle control units 120 and 220 perform communication based on the bundle protocol of DTN instead of communication based on TCP/IP.

The bundle control unit 120 switches the communication from the client application 101 to the communication destination from the communication based on TCP/IP to the communication based on the bundle protocol of DTN according to the state of the connection with the communication destination. At this time, the connection monitoring unit 112 monitors the state of the connection with the communication destination and controls the address conversion unit 113 according to the state of the connection.

Accordingly, the connection monitoring unit 112 switches the communication with the communication destination of the client application 101 from the communication by TCP/IP to the communication according to the bundle protocol of DTN. Accordingly, the communication protocol of the client application 101 is switched from the TCP/IP of the TCP processing unit 102 to the bundle protocol of the bundle control unit 120.

Further, the bundle control unit 220 switches the communication from the server application 201 to the communication destination from the communication based on TCP/IP to the communication based on the bundle protocol of DTN according to the state of the connection with the communication destination. At this time, the connection monitoring unit 212 monitors the state of the connection with the communication destination and controls the address conversion unit 213 according to the state of the connection.

Accordingly, the connection monitoring unit 212 switches the communication with the communication destination of the server application 201 from the communication by TCP/IP to the communication according to the bundle protocol of DTN. Accordingly, the communication protocol of the server application 201 is switched from the TCP/IP of the TCP processing unit 202 to the bundle protocol of the bundle control unit 220.

The bundle control units 120 and 220 perform communication based on the bundle protocol, for example, in accordance with the regulations of RFC5050. The bundle control units 120 and 220 transmit transmission object data of the server application 201 and the client application 101, with the data accommodated in a payload portion of a data message called a bundle.

The format of a bundle is illustrated in FIG. 4. The bundle includes a primary bundle block and a bundle payload block. The primary bundle block includes information on a source and a destination, a lifetime ("Lifetime") indicating a time until deletion of a bundle, and the like. The bundle payload block includes a payload ("Bundle Payload") for accommodating data. Each item in the bundle is specified in RFC5050.

When transmitting the bundle, the bundle control units 120 and 220 refer to the path TBL 123 and 223 to acquire a destination IP address and a TCP port number (hereinafter referred to as a "port number") on the TCP/IP corresponding to the EID (Endpoint ID) indicating a destination in the bundle protocol. When the connection with the destination, that is, the connection between the terminal 1 and the server 2, is closed, the bundle control units 120 and 220 store the bundle in the bundle buffers 122 and 222, and read and transmit the bundle from the bundle buffers 122 and 222 when the connection is reestablished.

Accordingly, the communication based on the DTN is performed. In the case of the terminal 1, the bundle transmission/reception is performed by the bundle control unit 120 controlling the wireless LAN module 14, and in the case of the server 2, the bundle transmission/reception is performed by the bundle control unit 220 controlling the communication port 24.

FIG. 5 illustrates an example of the bundle buffers 122 and 222. The bundle buffers 122 and 222 are bundle storage areas. A bundle is stored in the bundle buffer 122 together with a bundle ID identifying the bundle. The bundle control units 120 and 220 store the bundle in the bundle buffer 122 not only when transmitting the bundle but also when receiving the bundle.

Referring back to FIG. 3, the proxy protocol function units 110 and 210 convert the communication of the client application 101 and the server application 201 from TCP socket communication to bundle protocol communication. At this time, the proxy protocol function units 110 and 210 set and control the bundle control units 120 and 220 according to a bundle API (Application Programming Interface), thereby making it possible to use the DTN even in general applications. Details of the proxy protocol function units 110 and 210 will be described below.

The address conversion units 113 and 213 convert the destinations of communication of the client application 101 and the server application 201 into the destinations of the transmission/reception control units 114 and 214. For example, in the terminal 1, the address conversion unit 113 converts a destination IP address and a port number of a packet addressed to the server 2 into a destination IP address and a port number of a TCP socket (hereinafter referred simply to as a "socket") set in the transmission/reception unit.

Therefore, the proxy protocol function units 110 and 210 can receive data of packets transmitted from the client application 101 and the server application 201 to the communication destination. That is, as an example of a receiving unit recited in the present disclosure, the proxy protocol function unit 110 of the terminal 1 receives packet data from the client application 101. The address conversion units 113 and 213 are realized by WFP (Windows Filtering Platform), for example, when Windows® is used as an OS, and are realized by "iptables", for example, when Linux® is used as an OS.

The transmission/reception control units 114 and 214 terminate the TCP socket communication of the client application 101 and the server application 201. The transmission/reception control units 114 and 214 establish a local loopback connection in a device.

For example, the transmission/reception control unit 114 of the terminal 1 monitors the connection of socket from the client application 101 and, in accordance with an instruction from the proxy control unit 111, establishes a socket for the server application 201 and transmits data to the instructed socket.

The transmission/reception control units 114 and 214 divide a packet received from the client application 101 and the server application 201 via the socket by a designated size according to a policy (an algorithm or a processing plan) set by a user or an operator, and output the divided packet to the proxy control units 111 and 211. The size of the division is, for example, a data size received from opening to closing of the socket, a packet reception size or a predetermined value.

In addition, the transmission/reception control units 114 and 214 use the event lists 126 and 226 to manage the transmission/reception of the bundle. The transmission/reception control units 114 and 214 register transmission event information related to the transmission of the bundle in the event lists 126 and 226 and recognize the completion of the bundle transmission processing when the transmission event information is deleted from the event lists 126 and 226 by the bundle transmission process. In the meantime, when the bundle is received, the transmission/reception control units 114 and 214 recognize the completion of the reception processing by acquiring reception event information related to the reception of the bundle from the event lists 126 and 226.

The transmission event information is stored in transmission queues of the event lists 126 and 226 and the reception event information is stored in reception queues of the event lists 126 and 226.

FIG. 5 illustrates an example of a transmission event queue and a reception event queue. As for the transmission event information, as an example, a transmission destination address and a size are registered together with an ID of the transmission event information. The transmission destination address indicates an IP address and a port number of the transmission destination, and the size indicates a bundle size of the transmission object.

As for the reception event information, as an example, a transmission destination address and a size are registered together with an ID of the reception event information. The transmission destination address indicates an IP address and a port number of the transmission destination, and the size indicates a bundle size of the transmission object.

The proxy control units 111 and 211 accommodate data of packets received by the transmission/reception control units 114 and 214 in the payload of a proxy message, and output the data to the bundle control units 120 and 220 by the bundle API. Thereby, the proxy control units 111 and 211 request the bundle control units 120 and 220 for a bundle transmission.

The proxy control units 111 and 211 manage the proxy message with a connection number corresponding to a destination. Each time the socket is opened by the transmission/reception control unit 114 and 214, the proxy control units 111 and 211 register a new connection number in the connection list 116 and 216.

FIG. 5 illustrates an example of the connection lists 116 and 216. In the connection lists 116 and 216, a connection number, a socket channel ID, and a destination EID are registered in association. The socket channel ID is an identifier of the socket of the transmission/reception control units 114 and 214.

The proxy control units 111 and 211 give the proxy message a connection number corresponding to a socket channel ID of the reception source socket of the packet, and output it to the bundle control units 120 and 220. In addition, the proxy control units 111 and 211 request the bundle control units 120 and 220 for transmission of the bundle to the corresponding destination EID.

Accordingly, the EID of the server 2 is registered in the destination EID of the connection list 116 of the terminal 1, and the EID of the terminal 1 is registered in the destination EID of the connection list 216 of the server 2. By reading the initial setting files 117 and 217, the proxy control units 111 and 211 acquire information required for communication of the EID of the own device, the EID of a communication destination, etc.

In addition, the proxy control units 111 and 211 receive the proxy message from the bundle control units 120 and 220. When a connection number of the received proxy message is not registered in the connection list 116 and 216, the proxy control units 111 and 211 instruct the transmission/reception control units 114 and 214 to open a new socket, and start communication by the socket.

In the case where data is not contained in the received proxy message, the proxy control units 111 and 211 search a socket channel ID corresponding to the connection number from the connection list 116. The proxy control units 111 and 211 instruct the transmission/reception control units 114 and 214 to delete the socket of the searched socket channel ID.

In this manner, the socket and the EID are managed in association with each other by the connection list 116. Therefore, the TCP/IP communication using the socket can be performed based on the bundle protocol.

In addition, the bundle control units 120 and 220 transmit the bundle in response to a bundle transmission request from the proxy control units 111 and 211. Accordingly, the bundle control units 120 and 220 can perform communication from the client application 101 and the server application 201 to the communication destination based on the protocol of a disruption tolerant network. Upon completing of the bundle transmission, the bundle control units 120 and 220 delete the corresponding transmission event information from the transmission event queue of the event list 126. Upon receiving the bundle, the bundle control units 120 and 220 register the corresponding reception event information in the reception event queue of the event list 126.

When the communication from the client application 101 and the server application 201 requires a response, the response control units 115 and 215 generate the response and output the responses to the client application 101 and the server application 201. Therefore, even when the communication with the communication destination is disrupted due to the close of the connection, the client application 101 and the server application 201 operate without recognizing the communication disruption. Accordingly, it is not necessary to retry the communication after reconnection of the connection.

For example, in the terminal 1, when the proxy control unit 111 communicates with the client application 101, the response control unit 115 outputs a response to the communication to the client application 101. In the case of transmitting divided files from the client application 101 to the server application 201, the response control unit 115 of the terminal 1 prompts the client application 101, instead of the server application 201, to transmit the next file data, as a response.

The connection monitoring units 112 and 212 monitor the state of the connections of the bundle control units 120 and 220. The connection monitoring units 112 perform connection of the connection under a state where the connection is closed. When the connection is successful, the connection monitoring units 112 and 212 is instructed to transmit the bundle of the transmission object in the bundle buffers 122 and 222.

In addition, the connection monitoring units 112 and 212 set and delete conversion information for the address conversion units 113 and 213 according to the state of the connection. The connection monitoring units 112 and 212 set the conversion information based on the filter TBLs 118 and 218.

FIG. 5 illustrates an example of the filter TBLs 118 and 218. In the filter TBLs 118 and 218, the filter conditions, conversion information and setting state of a packet are registered in association. An IP address, a port number and the like of the source and the destination of a packet subjected to address conversion are designated in the filter conditions. The conversion information indicates a rewriting object portion of a packet matching the filter conditions and a value after rewriting. The setting state indicates validity or invalidity of the filter conditions and conversion information setting.

The connection monitoring units 112 and 212 set or delete the conversion information of the address conversion units 113 and 213 according to the state of the connection. Therefore, the bundle protocol is automatically applied to the communication of the client application 101 and the server application 201.

In this manner, the connection monitoring units 112 and 212 detect the state of the connection with the communication destination and determine whether to apply the bundle protocol to the communication of the client application 101 and the server application 201 according to the connection state. Therefore, the bundle protocol is used for the communication of the client application 101 and the server application 201 according to the connection state.

When the communication is intermittent, the client application 101 and the server application 201 perform communication by converting TCP/IP protocol according to the above configuration.

Figure 6:
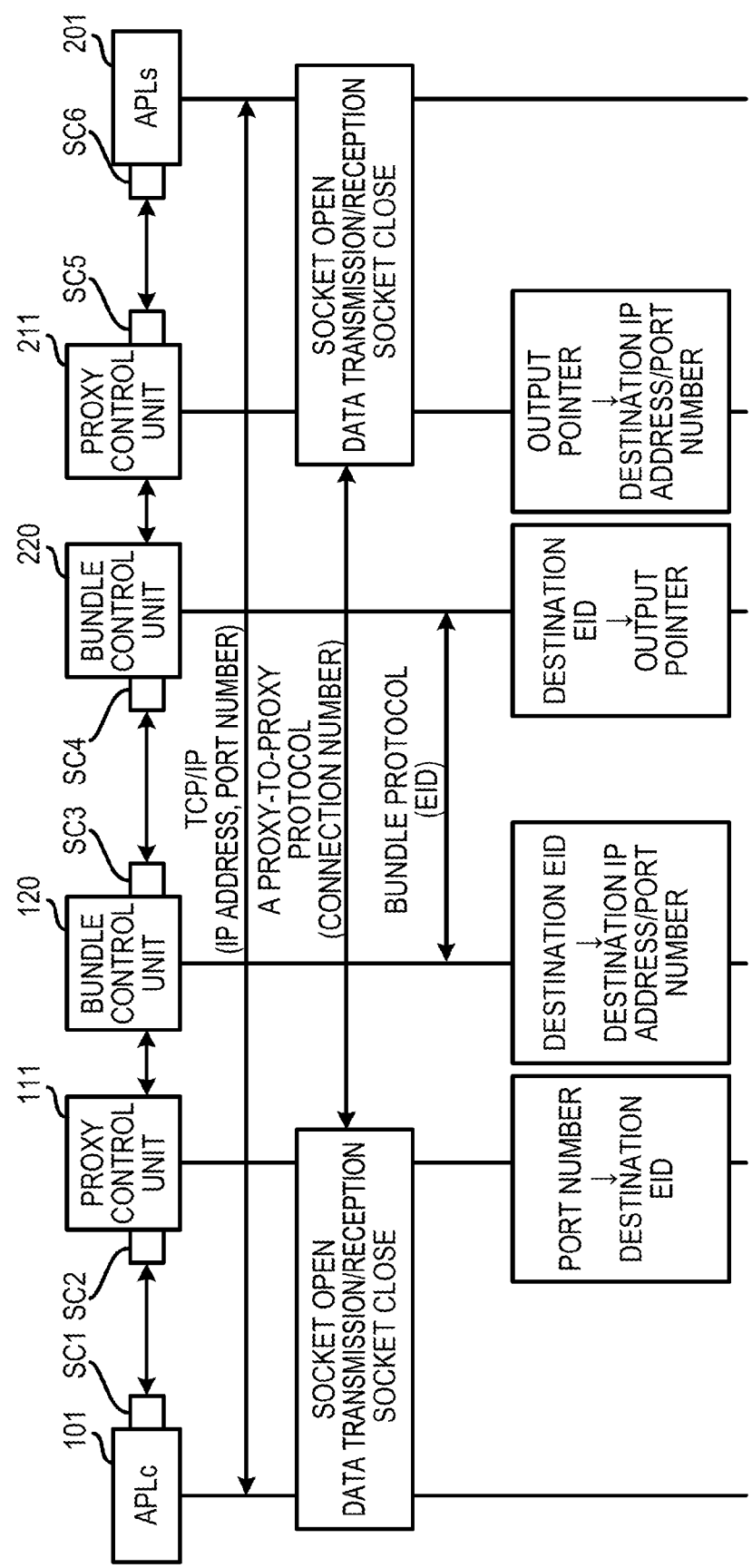
FIG. 6 is a view illustrating an example of protocol conversion.

FIG. 6 illustrates an example of a protocol conversion. FIG. 6 illustrates the client application 101, the proxy control unit 111 and the bundle control unit 120 of the terminal 1, the server application 201, the proxy control unit 211, and the bundle control unit 220 of the server 2, among the configuration illustrated in FIG. 3.

A TCP/IP communication using an IP address and a port number is performed between the client application 101 and the server application 201. An arbitrary socket SC1 is opened in the client application 101 and a fixed socket SC6 is opened in the server application 201.

Communication by a proxy-to-proxy protocol based on a connection number is performed between the proxy control units 111 and 211. In the proxy control unit 111, a socket SC2 in the one-to-one correspondence to the socket SC6 of the server application 201 is opened by the transmission/reception control unit 114. In the proxy control unit 211, a socket SC5 in the one-to-one correspondence to the socket SC1 of the client application 101 is opened by the transmission/reception control unit 214.

Communication by the sockets SC1 and SC2 is performed between the client application 101 and the proxy control unit 111, and communication by the sockets SC5 and SC6 is performed between the server application 201 and the proxy control unit 211. Therefore, the transmission/reception control units 114 and 214 open and close the sockets SC2 and SC5 in accordance with the sockets SC1 and SC6 of the client application 101 and the server application 201, respectively, and perform data transmission/reception by the sockets SC2 and SC5.

A bundle protocol communication by EID is performed between the bundle control units 120 and 220. In the bundle control units 120 and 220, the sockets SC3 and SC4 are opened, respectively.

When communication is performed from the client application 101 to the server application 201, in the terminal 1, the proxy control unit 111 converts the port number of the packet into a destination EID based on the initial setting file 117, and the bundle control unit 120 converts the destination EID into a destination IP address and a port number based on the path TBL 123.

In the server 2, the bundle control unit 220 converts the destination EID into an output pointer to be described later and the proxy control unit 211 converts the output pointer into a destination IP address and a port number. In this manner, the communication from the client application 101 to the server application 201 is performed.

Referring back to FIG. 3, the transmission order of the bundle from the terminal 1 to the server 2 matches the reception order from the application. However, this transmission order may not be appropriate depending on the usage of the data in the bundle. For example, in a case of transmitting data with high real-time property such as video data of a surveillance camera, if old video data is transmitted earlier than new video data in a chronological order, since confirmation of the new video is delayed on the receiving side, there is a possibility of causing a trouble in surveillance.

In contrast, when the bundle control unit 120 discards the old video data, since the new video data can be preferentially transmitted, it is possible to prevent a trouble from occurring in the surveillance. However, the old video data may not be discarded because it may be used for past video analysis.

Therefore, in accordance with the data remaining amount of the bundle in the bundle buffer 122, the terminal 1 divides a relay path into one for data of a bundle having a low priority (hereinafter referred to as "low priority data") in the bundle buffer 122 and one for data of a bundle having a high priority (hereinafter referred to as "high priority data"). For example, the high priority data is video data with new time information and the low priority data is video data with old time information.

More specifically, the high priority data is transmitted by the bundle control unit 120 from the bundle buffer 122 to the bundle buffer 122 of the server 2 via a relay path Ra. The low priority data is exported by the export processing unit 125 from the export buffer 127 to the import buffer 227 of the server 2 via a relay path Rb. As a result, the terminal 1 can relay the high priority data to the server 2 preferentially and can relay the low priority data to the server 2 at an arbitrary timing without discarding the low priority data. This relay communication method will be described below.

The relay path determination unit 124 performs a determination process on a relay path of a bundle. When the proxy protocol function unit 110 receives data of a new packet from the client application 101, the relay path determination unit 124 determines a relay path of each data based on the data remaining amount of the bundle to be relayed to a communication destination and a priority of each data of plural packets received from the client application 101. Here, the relay path determination unit 124 is an example of a determination unit recited in the present disclosure.

More specifically, the relay path determination unit 124 acquires the data remaining amount of a bundle stored in the bundle buffer 122 and compares it with a predetermined amount. When the data remaining amount is equal to or larger than the predetermined amount, the relay path determination unit 124 instructs the export processing unit 125 to export the bundle according to the priority for each bundle. The relay path determination unit 124 compares the priorities of the bundles in the bundle buffer 122 and instructs the export processing unit 125 to export the low priority data based on a result of the comparison.

Therefore, since the high priority data remains stored in the bundle buffer 122, it is transmitted to the server 2 via the relay path Ra. In this example, the relay path determination unit 124 instructs the export process when the data remaining amount is 0 (Byte) or more, but the present disclosure is not limited thereto. For example, the relay path determination unit 124 may instruct the export process when the data remaining amount is 1 (Mbyte) or more.

The bundle priority may be time information, for example, when packet data is video data. In this case, for example, the client application 101 acquires video data from the surveillance camera and sets a priority based on the time information given to each video data. The priority is given to a packet, for example, as control information.

The export processing unit 125 is an example of a data processing unit recited in the present disclosure, acquires a bundle instructed from the bundle buffer 122 to the relay path determination unit 124, and stores the bundle in the export buffer 127. As a result, the low priority data in the bundle buffer 122 is moved to the export buffer 127.

The export buffer 127 is an example of a storage area corresponding to a USB communication interface, recited in the present disclosure. The low priority data in the export buffer 127 is written in the storage medium 9, for example, under the control of the USB-IF 18 and is relayed to the server 2 via the relay path Rb.

In this manner, the export processing unit 125 stores the low priority data in a storage area corresponding to a communication interface different from the high priority data. Therefore, the terminal 1 can relay the low priority data by a communication interface different from the high priority data. Note that the relay path Rb is not limited to a path by the storage medium 9 but may be a relay path by a near field radio communication (NFC), for example. In this case, the USB-IFs 18 and 26 are connected to a communication device corresponding to NFC.

When storing the low priority data in the export buffer 127, the export processing unit 125 deletes the transmission event information corresponding to the low priority data from the event list 126. The export processing unit 125 gives the transmission event information to the low priority data to be stored. Therefore, despite that the low priority data is relayed via the relay path Rb different from the high priority data, the transmission/reception control unit 114 can recognize the transmission of the bundle in a pseudo manner. The transmission event information is an example of information related to the low priority data relay process, recited in the present disclosure.

In the server 2, the USB-IF 26 reads the low priority data from the storage medium 9, for example, and writes low priority data in the import buffer 227. The import processing unit 225 monitors the import buffer 227 periodically, for example. When the low priority data is detected in the import buffer 227, the import processing unit 225 reads the low priority data from the import buffer 227 and writes the low priority data in the bundle buffer 222.

At this time, the import processing unit 225 registers the reception event information corresponding to the low priority data in the reception event queue of the event list 226. Therefore, the transmission/reception control unit 214 can recognize the reception of the bundle in a pseudo manner, despite that the low priority data has been relayed via the relay path Rb different from the high priority data.

In this manner, the relay path determination unit 124 determines the relay paths Ra and Rb of each data based on the data remaining amount to be relayed to the server 2 in response to the reception of new data of the client application 101 by the proxy protocol function unit 110 and a priority of each data received from the client application 101. Therefore, the terminal 1 can process the data transmission preferentially without discarding the data. The relay paths Ra and Rb are an example of a relay path according to the protocol of the disruption tolerant network, recited in the present disclosure.

Here, in a case where the priority is set based on the time information assigned to each data received from the client application 101, the terminal 1 can relay new video data in a chronological order to the server 2 preferentially and can relay old video data to the server 2 at an arbitrary timing.

When the proxy protocol function unit 110 receives new data, the relay path determination unit 124 compares the priority of the new data with the priority of untransmitted data (hereinafter referred to as "preceding data") received earlier than the new data. In accordance with a result of the comparison, the relay path determination unit 124 instructs the export processing unit 125 to export the low priority data.

Therefore, when the new data is low priority data, the export processing unit 125 assigns the transmission event information to the new data and stores the new data in the export buffer 127. When the preceding data is the low priority data, the export processing unit 125 assigns the transmission event information to the preceding data and stores the preceding data assigned with the transmission event information in the export buffer 127. It should be noted that the preceding data corresponds to data other than the above-mentioned new data among a plurality of data received from the client application 101.

Further, when the proxy protocol function unit 110 receives new data, the relay path determination unit 124 determines a relay path based on the bundle size of the data. More specifically, the relay path determination unit 124 compares the bundle size of the new data with a predetermined value. When the bundle size is equal to or larger than the predetermined value, the relay path determination unit 124 instructs the export processing unit 125 to export the data. The export processing unit 125 assigns the transmission event information to the new data and stores the new data assigned with the transmission event information in the export buffer 127.

Therefore, data of a large size is relayed from the export buffer 127 to the server 2 via the relay path Rb at an arbitrary timing and data of a small size is relayed from the bundle buffer 122 to the server 2 via the relay path Ra. As a result, since the terminal 1 can transmit the small size data in preference to the large size data, it is possible to prevent the transmission of the small size data from being delayed due to the transmission of the large size data.

Next, a process performed by each of the terminal 1 and the server 2 will be described.

Figure 7:
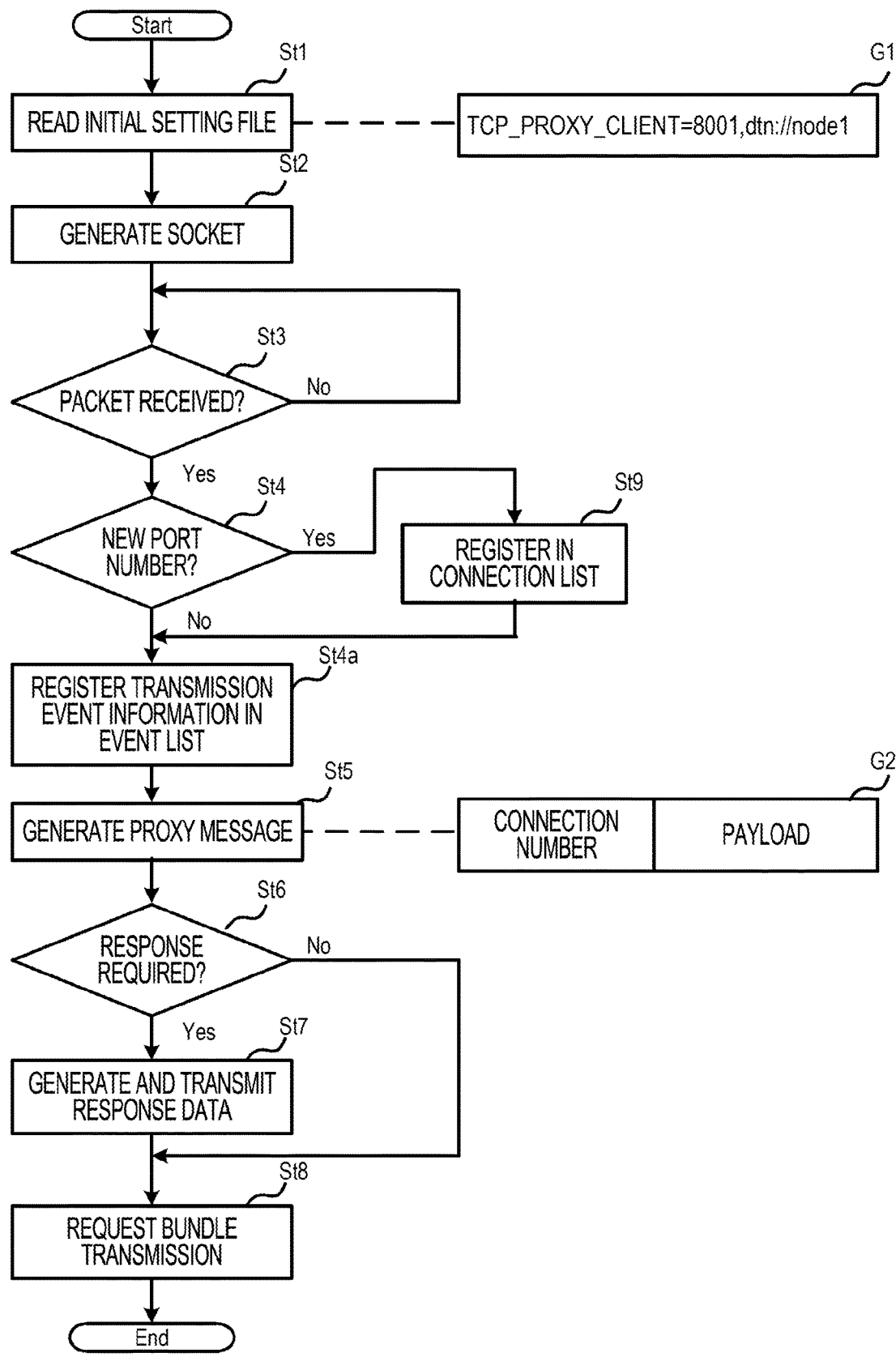
FIG. 7 is a flowchart illustrating an example of a data transmission process of a client application.

FIG. 7 is a flowchart illustrating an example of a data transmission process of the client application 101. The proxy control unit 111 of the terminal 1 reads the initial setting file 117 as indicated by reference symbol G1 (step St1). In the initial setting file 117 are written with an EID "dtn://node1" of the terminal 1 and a port number "8001" for receiving a packet with TCP addressed to the server application 201 of the communication destination, as "TCP_PROXY_CLIENT".

Next, the proxy control unit 111 generates in the transmission/reception control unit 114 a socket for receiving a packet addressed to the server application 201 from the client application 101 (step St2). The above port number "8001" or a loopback IP address "127.0.0.1" is set in the socket. The client application 101 transmits a packet to the socket generated by the transmission/reception control unit 114, instead of the socket of the server application 201. At this time, a destination IP address and a port number of the packet are converted by predetermined setting or by the address conversion unit 113.

Next, the transmission/reception control unit 114 determines whether or not a packet is received in the socket (step St3). When no packet is received (No in step St3), the transmission/reception control unit 114 again executes the determination process of step St3.

When a packet is received (Yes in step St3), the proxy control unit 111 determines whether or not a source port number of the packet is new (step St4). That is, the proxy control unit 111 determines whether or not the port number of the client application 101 has been changed to establish a new channel. When the packet is received by the socket, the transmission/reception control unit 114 detects the completion of the communication from the client application 101 and outputs the data of the received packet to the proxy control unit 111 via a memory or the like.

When the source port number is new (Yes in step St4), the proxy control unit 111 registers a new connection number and a socket channel ID and a destination EID corresponding to the connection number in the connection list 116 (step St9). When the source port number is not new (No in step St4), the proxy control unit 111 does not execute the process of step St9.

Next, the transmission/reception control unit 114 registers the transmission event information corresponding to the packet data in the transmission event queue of the event list 126 (step St4a).

Next, the proxy control unit 111 generates a proxy message as indicated by reference symbol G2 (step St5). The proxy message includes a connection number and a payload. The proxy control unit 111 creates the proxy message by accommodating the packet data in the payload and assigning the packet data with a connection number retrieved from the connection list 116. The proxy message is output to the bundle control unit 120 by the bundle API.

Next, the response control unit 115 determines whether or not to respond to the packet to be transmitted (step St6). The response control unit 115 determines whether or not there is a response necessary for continuing the communication at the application level, not ACK of TCP.

When a response is necessary (Yes in step St6), instead of the server application 201, the response control unit 115 generates response data based on a predetermined algorithm and transmits the response data to the client application 101 (step St7). That is, the response control unit 115 notifies the client application 101 of the completion of communication. When a response is unnecessary (No in step St6), the response control unit 115 generates no response data.

Next, the proxy control unit 111 requests the bundle control unit 120 to transmit a bundle by using the bundle API (step St8). The bundle control unit 120 generates a bundle from the proxy message and transmits the bundle. Accordingly, the bundle control units 120 and 220 perform communication from the client application 101 and the server application 201 to the communication destination based on the protocol of a disruption tolerant network. In this way, the data transmission process of the client application 101 is executed.

Figure 8:
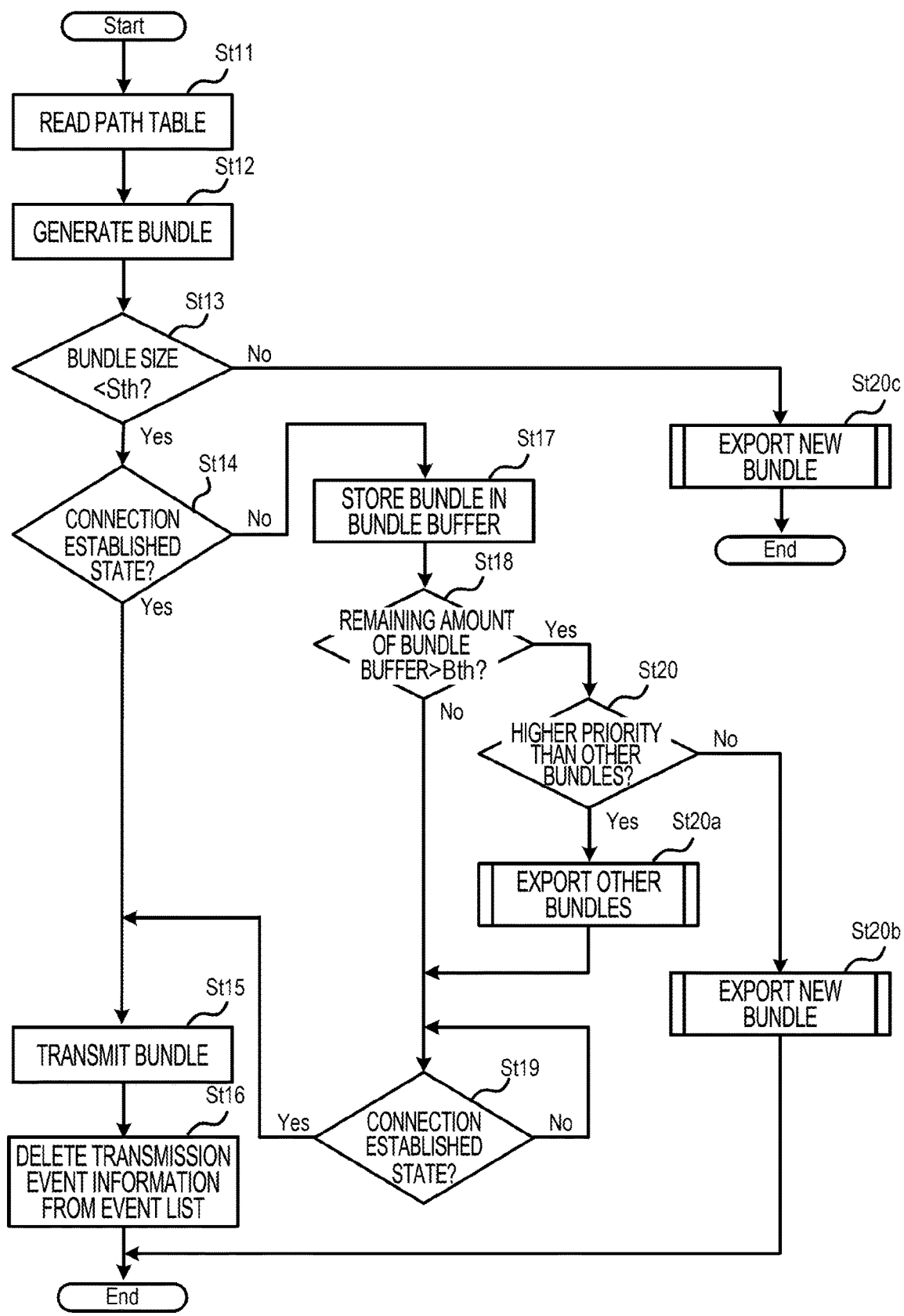
FIG. 8 is a flowchart illustrating an example of a bundle transmission process.

FIG. 8 is a flowchart illustrating an example of a bundle transmission process. Upon receiving a bundle transmission request from the proxy control unit 111, the bundle control unit 120 reads the path TBL 123 (step St11). Next, based on the path TBL 123, the bundle control unit 120 generates a bundle of a destination EID corresponding to a destination IP address and a port number (step St12).

Next, the relay path determination unit 124 compares the size of the newly generated bundle (hereinafter referred to as a "new bundle") with a predetermined value Sth (step St13). When the size of the new bundle is equal to or larger than the predetermined value Sth (No in step St13), the relay path determination unit 124 instructs the export processing unit 125 to export the bundle (step St20c) and then the process is ended. Therefore, the export process is executed when the size of the new bundle is equal to or larger than the predetermined value Sth. Here, the predetermined value Sth is set in advance according to the allowable amount of delay of bundle at the time of relaying to the server 2, for example. The new bundle corresponds to the above-mentioned new data.

In this way, in response to the reception of new data by the proxy protocol function unit 110, the relay path determination unit 124 determines the relay paths Ra and Rb based on the size of bundle of the data. Accordingly, as described above, since the terminal 1 can transmit data of a smaller size in preference to data of a larger size, it is possible to prevent the transmission of the smaller size data from being delayed due to the transmission of the larger size data.

When the size of the new bundle is smaller than the predetermined value Sth (Yes in step St13), the bundle control unit 120 determines whether or not the connection with the communication destination according to the destination EID is in an established state (step St14). When the connection is in an established state (Yes in step St14), the bundle control unit 120 transmits the bundle (step St15). Next, the bundle control unit 120 deletes the transmission event information from the transmission event queue of the event list 126 (step St16) and then the process is ended.

When the connection is not in an established state (No in step St14), the bundle control unit 120 stores the bundle in the bundle buffer 122 (step St17). Next, the relay path determination unit 124 compares the data remaining amount of the bundle of the bundle buffer 122 with a predetermined amount Bth (step St18). When the remaining data amount is equal to or smaller than the predetermined amount Bth (No in step St18), the bundle control unit 120 determines whether or not the connection with the communication destination according to the destination EID is in an established state (step St19).

Here, the predetermined amount Bth is preset in accordance with the allowable amount of delay of the bundle at the time of relaying to the server 2, for example. Therefore, the export process is executed when the data remaining amount of the bundle buffer 122, that is, a storage amount, is larger than the predetermined amount Bth. Accordingly, when the delay of the bundle becomes problematic, the bundle is stored in the export buffer 127 and is relayed to the server 2 via the relay path Rb. In the present example, the predetermined amount Bth is set to zero (0) but the present disclosure is not limited thereto.

When the connection is in an established state (Yes in step St19), the bundle control unit 120 transmits the bundle (step St15). When the connection is not in an established state (No in step St19), the bundle control unit 120 again executes the process of step St19.

When the data remaining amount is larger than the predetermined amount Bth (Yes in step St18), the relay path determining unit 124 determines whether or not the new bundle has a higher priority than the other bundles in the bundle buffer 122 (step St20). When the new bundle has a lower priority than the other bundles in the bundle buffer 122 (No in step St20), the relay path determination unit 124 instructs the export processing unit 125 to export the new bundle (step St 20b) and then the process is ended.

When the new bundle has a higher priority than the other bundles in the bundle buffer 122 (Yes in step St20), the relay path determination unit 124 instructs the export processing unit 125 to export another bundle (Step St 20a). Thereafter, the process of step St19 is executed. In this way, the bundle transmission process is executed.

Figure 9:
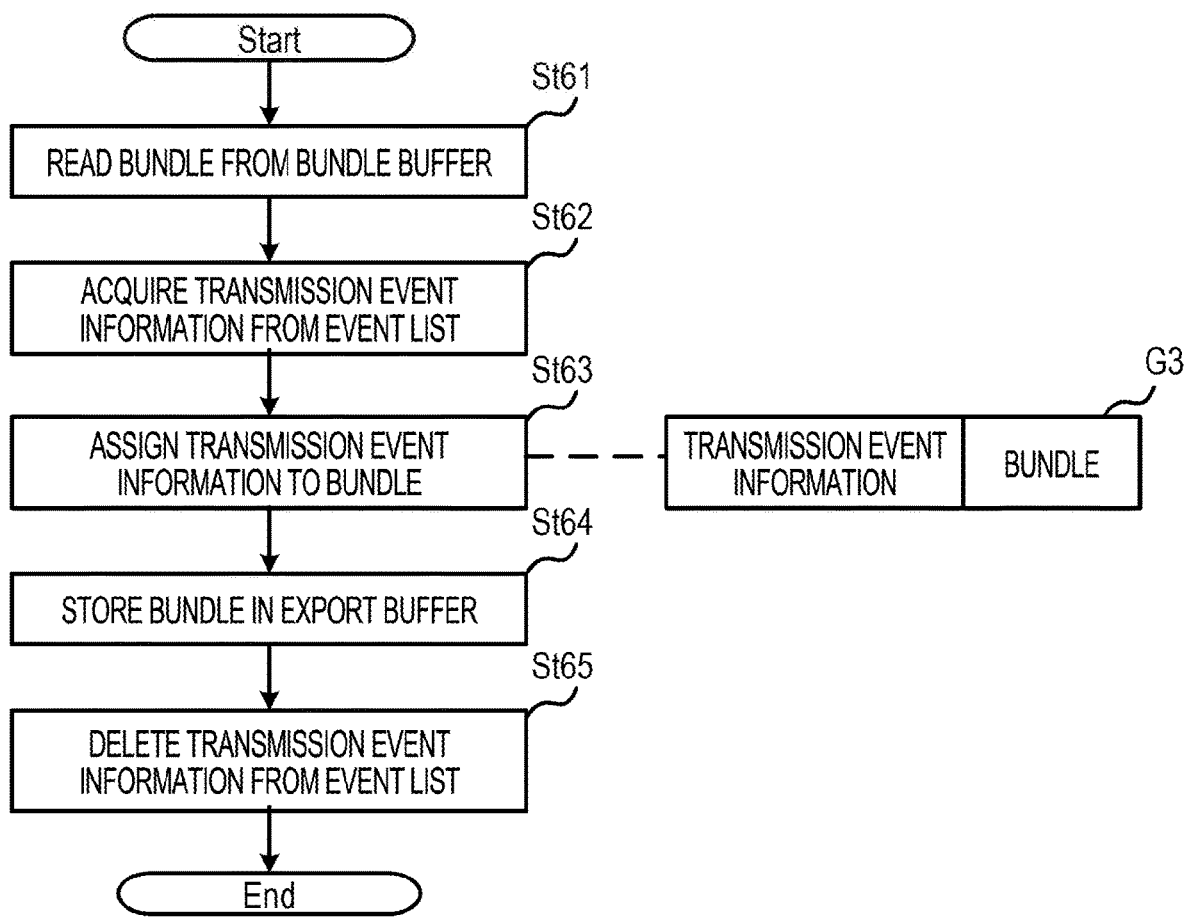
FIG. 9 is a flowchart illustrating an example of a bundle export process.

FIG. 9 is a flowchart illustrating an example of a bundle export process. This process is a process executed by the export processing unit 125 in accordance with an instruction from the relay path determination unit 124 in the above-described steps St20 a to 20c. In the description of this process, new bundles and other bundles are simply referred to as "bundles".

The export processing unit 125 reads from the bundle buffer 122 a bundle instructed to the relay path determination unit 124 (step St61). Next, the export processing unit 125 acquires the transmission event information from the transmission event queue of the event list 126 (step St62). Next, the export processing unit 125 assigns the transmission event information to the bundle, as indicated by reference symbol G3 (step St63).

Next, the export processing unit 125 stores the bundle assigned with the transmission event information in the export buffer 127 (step St64). As a result, the bundle is relayed to the server 2 via the relay path Rb.

Next, the export processing unit 125 deletes the transmission event information from the transmission event queue of the event list 126 (step St65). Accordingly, the transmission/reception control unit 114 recognizes the completion of bundle transmission in a pseudo manner. In this way, the export process is executed.

With respect to step st20a, when the remaining data amount in the bundle buffer 122 is larger than the predetermined amount Bth and the new bundle has a higher priority than the other bundles, the export processing unit 125 stores the other bundles in the export buffer 127. Therefore, the terminal 1 can relay the new bundle to the server 2 in preference to other bundles and can relay the other bundles to the server 2 at an arbitrary timing via the relay path Rb different from the new bundle.

In addition, with respect to step st20a, when the remaining amount of data in the bundle buffer 122 is larger than the predetermined amount Bth and the new bundle has a higher priority than the other bundles, the export processing unit 125 assigns the transmission event information to the other bundles. Therefore, the terminal 1 can transmit other bundles according to the bundle protocol in a pseudo manner.

With respect to step st20b, when the remaining data amount in the bundle buffer 122 is larger than the predetermined amount Bth and the new bundle has a lower priority than the other bundles, the export processing unit 125 stores the new bundle in the export buffer 127. Therefore, the terminal 1 can relay the other bundles to the server 2 in preference to the new bundle and can relay the new bundle to the server 2 at an arbitrary timing via the relay path Rb different from the other bundles.

With respect to step st20c, when the bundle size is equal to or larger than the predetermined amount Sth, the export processing unit 125 stores the new bundle in the export buffer 127. Therefore, the terminal 1 can relay a bundle of a smaller size to the server 2 in preference to a bundle of a larger size and can relay the bundle of a larger size to the server 2 at an arbitrary timing via the relay path Rb different from the bundle of a smaller size.

Figure 10:
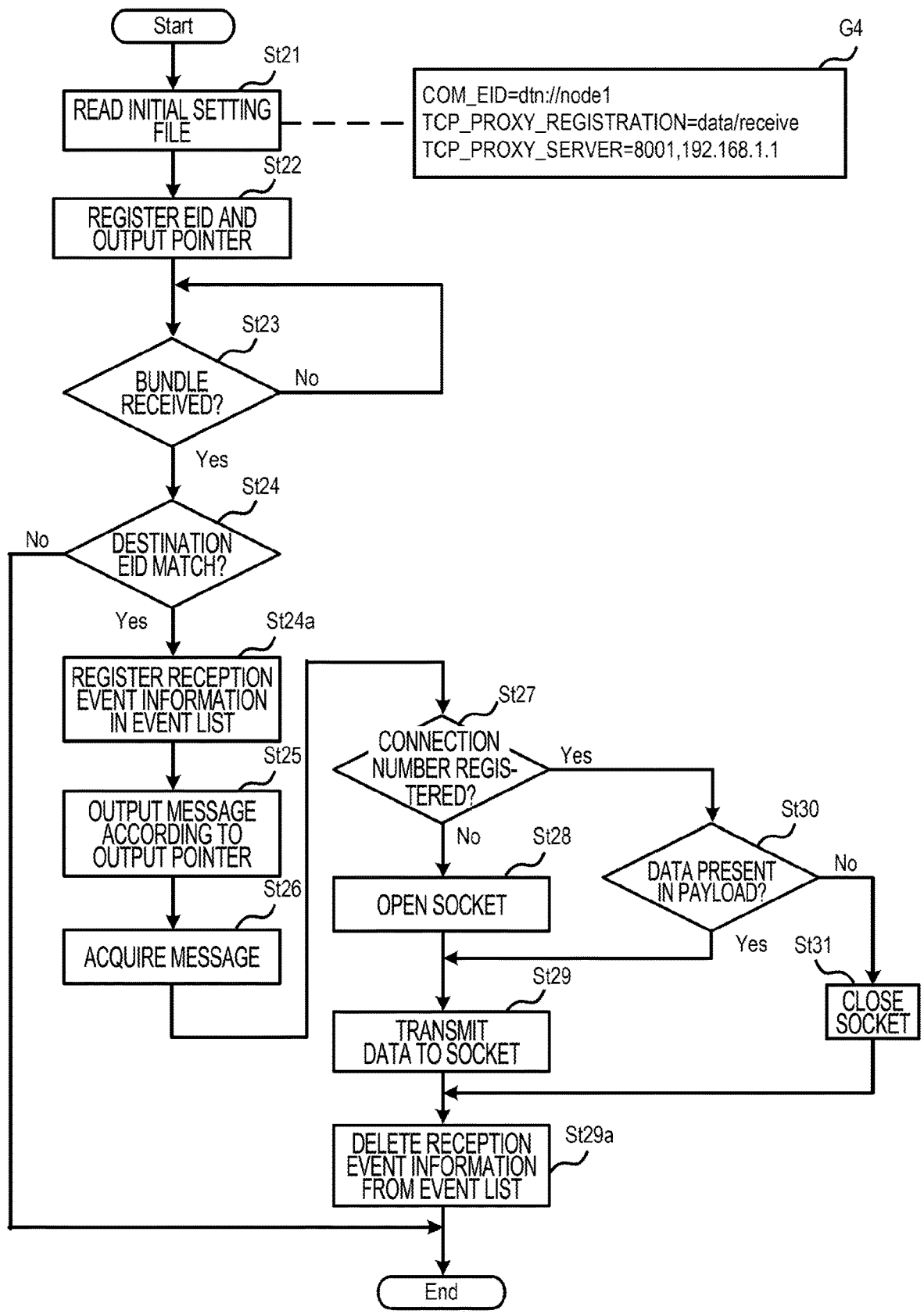
FIG. 10 is a flowchart illustrating an example of a bundle reception g process.

FIG. 10 is a flowchart illustrating an example of a bundle reception process. This process is executed in the server 2.

The proxy control unit 211 reads out the initial setting file 217 as indicated by reference symbol G4 (step St21). In the initial setting file 217, EID "dtn://node1" of the server 2 is recorded as "COM_EID", an output pointer "data/receive" of the received data of the server 2 is recorded as "TCP_PROXY_REGISTRATION", and an IP address "192.168.1.1" and a port number "8001" of the server 2 are recorded as "TCP_PROXY_SERVER".

Next, the proxy control unit 211 registers the EID and the output pointer by the bundle API so that the bundle control unit 220 can receive the bundle from the client application 101 of the terminal 1 (step St22). At this time, the proxy control unit 211 registers the EID and the output pointer respectively designated in "COM_EID" and "TCP_PROXY_REGISTRATION" of the initial setting file 217. Accordingly, upon receiving the bundle, the bundle control unit 220 outputs the bundle to a designated directory of the output pointer "data/receive".

Next, the bundle control unit 220 determines whether or not the bundle is received (step St23). When the bundle is not received (No in step St23), the bundle control unit 220 again executes the process of step St23. When the bundle is received (Yes in step St23), the bundle control unit 220 determines whether or not the EID registered in step St 22 matches a destination EID of the bundle (step St24).

When the registered EID does not match the destination EID of the bundle (No in Step St24), since the bundle is not addressed to the own device, the bundle control unit 220 discards the bundle and then the process is ended. When the registered EID matches the destination EID of the bundle (Yes in step St24), the bundle control unit 220 registers the reception event information corresponding to the bundle in the reception event queue of the event list 226 (step St24a). Next, the bundle control unit 220 acquires packet data from the payload of the bundle, generates a proxy message, and outputs the proxy message to the designated directory of the output pointer (step St25).

Next, the proxy control unit 211 refers to the designated directory of the output pointer to acquire a proxy message (step St26). Next, the proxy control unit 211 determines whether or not a connection number of the proxy message has been registered in the connection list 116 (step St27).

When the connection number is unregistered (No in step St27), the proxy control unit 211 instructs the transmission/reception control unit 214 to open a socket of the IP address and the port number designated in "TCP_PROXY_SERVER" of the initial setting file 217 (Step St28). When the connection number is already registered (Yes in step St27), the proxy control unit 211 determines whether or not packet data is accommodated in the payload of the proxy message (step St30).

When the packet data is accommodated (Yes in step St30), the proxy control unit 211 transmits the data to the corresponding socket (step St29). Next, the transmission/reception control unit 214 deletes the reception event information corresponding to the data from the reception event queue of the event list 226 (step St29*a*) and then the process is ended.

When the packet data is not accommodated (No in step St30), the proxy control unit 211 instructs the transmission/reception control unit 114 to close the corresponding socket (step St31). In this manner, the bundle reception process is executed.

Figure 11:
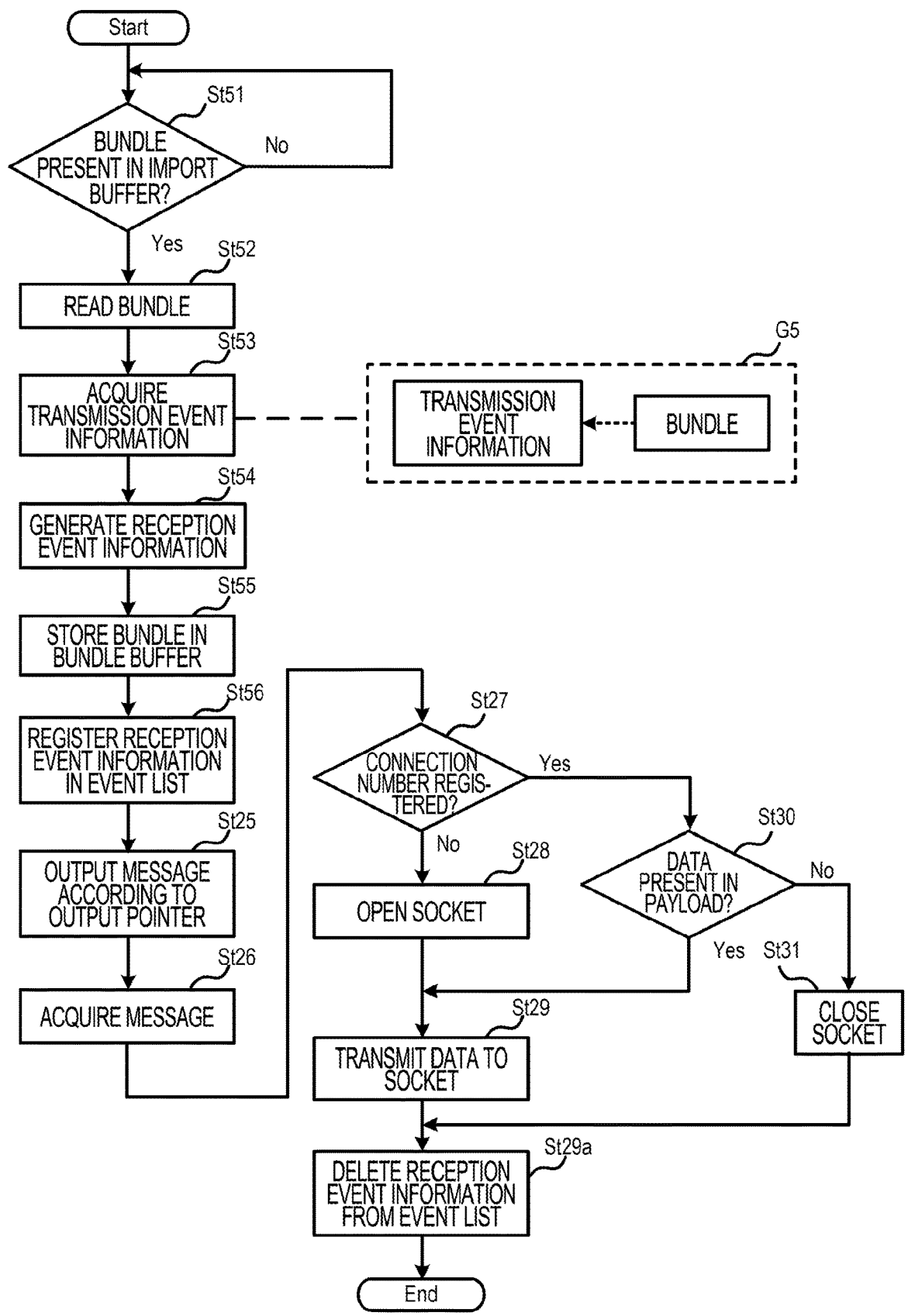
FIG. 11 is a flowchart illustrating an example of a bundle import process.

FIG. 11 is a flowchart illustrating an example of a bundle import process. In FIG. 11, the same steps as in FIG. 10 are denoted by the same reference symbols and explanation of which will not be repeated for the purpose of brevity.

The import process unit 225 determines whether or not there is a bundle in the import buffer 227 (step St51). When there is no bundle (No in step St51), the import processing unit 225 again executes the process of step St51.

When there is a bundle (Yes in step St51), the import processing unit 225 reads the bundle from the import buffer 227 (step St52). Next, the import processing unit 225 separates and acquires the transmission event information from the bundle (step St53), as indicated by reference symbol G5. Next, the import processing unit 225 generates the reception event information from the transmission event information (step St54). The reception event information has the same configuration as the transmission event information, as illustrated shown in FIG. 5.

Next, the import processing unit 225 stores in the bundle buffer 222 the bundle read from the import buffer 227 (step St55). Next, the import processing unit 225 registers the reception event information in the reception event queue of the event list 226 (step St56). Therefore, the server 2 can receive the bundle from the terminal 1 via the relay path Rb in a pseudo manner.

Thereafter, the process of steps St25 to St29*a* is executed. As a result, the imported bundle is outputted to the server application 201 in the same way as the bundle received via the relay path Ra. In this way, the bundle import process is executed.

Figure 12:
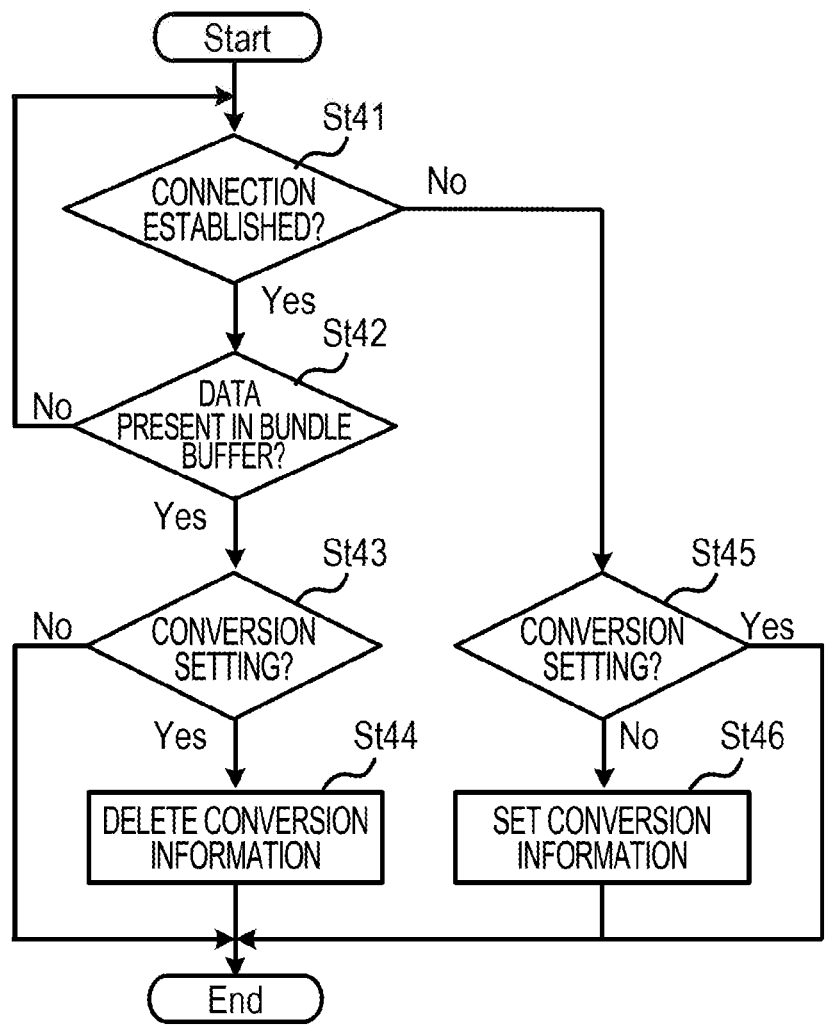
FIG. 12 is a flowchart illustrating an example of a bundle protocol application switching process.

FIG. 12 is a flowchart illustrating an example of a bundle protocol application switching process. The connection monitoring units 112 and 212 detect whether or not a connection is established with a communication destination (step St41).

Based on a destination IP address and a port number set in the path TBL 123 and 223, the bundle control units 120 and 220 detects the state of communication by up/down of a link with the corresponding communication destination or by the keep alive function. The connection monitoring units 112 and 212 acquire results of the detection by the bundle control units 120 and 220 or detect the state of the connection by control by a bundle API or the like.

When a connection is established (Yes in step St41), the connection monitoring units 112 and 212 determines whether or not a bundle waiting for transmission is stored in the bundle buffers 122 and 222 (step St42). When there is no stored bundle (No in step St42), the connection monitoring units 112 and 212 again execute the process of step St41.

When there is a stored bundle (Yes in step St42), the connection monitoring units 112 and 212 refer to the setting state of the filter TBLs 118 and 218 to determine whether or not there is a setting of conversion information for the address conversion units 113 and 213 (Step St43). When there is no setting of conversion information (No in step St43), the connection monitoring units 112 and 212 end the process. When there is a setting of conversion information (Yes in step St43), the connection monitoring units 112 and 212 delete the conversion information (step St44).

As a result, the transmission of a packet from the TCP processing units 102 and 202 to the sockets of the transmission/reception control units 114 and 214 is stopped. Accordingly, since the application of the bundle protocol to the communication between the client application 101 and the server application 201 is stopped, the direct TCP/IP communication without going through the proxy protocol function units 110 and 210 is performed.

In the meantime, when the connection is closed (No in step St41), the connection monitoring units 112 and 212 refer to the setting states of the filter TBLs 118 and 218 to determine whether or not there is a setting of conversion information for the address conversion units 113 and 213 (Step St45). When there is a setting of conversion information (Yes in step St45), the connection monitoring units 112 and 212 end the process. When there is no setting of conversion information (No in step St45), the connection monitoring units 112 and 212 set the conversion information (step St46).

As a result, the packet transmission from the TCP processing units 102 and 202 to the sockets of the transmission/reception control units 114 and 214 is started. Accordingly, since the application of the bundle protocol to the communication between the client application 101 and the server application 201 is started, the communication via the proxy protocol function units 110 and 210 is performed.

In this way, the connection monitoring units 112 and 212 detect the state of the connection with the communication destination and determine whether or not to apply the bundle protocol to the communication between the client application 101 and the server application 201 according to the detected connection state. Therefore, the bundle protocol is automatically applied.

Next, an example of an operation of relaying video data from the terminal 1 to the server 2 will be described.

Figure 13:
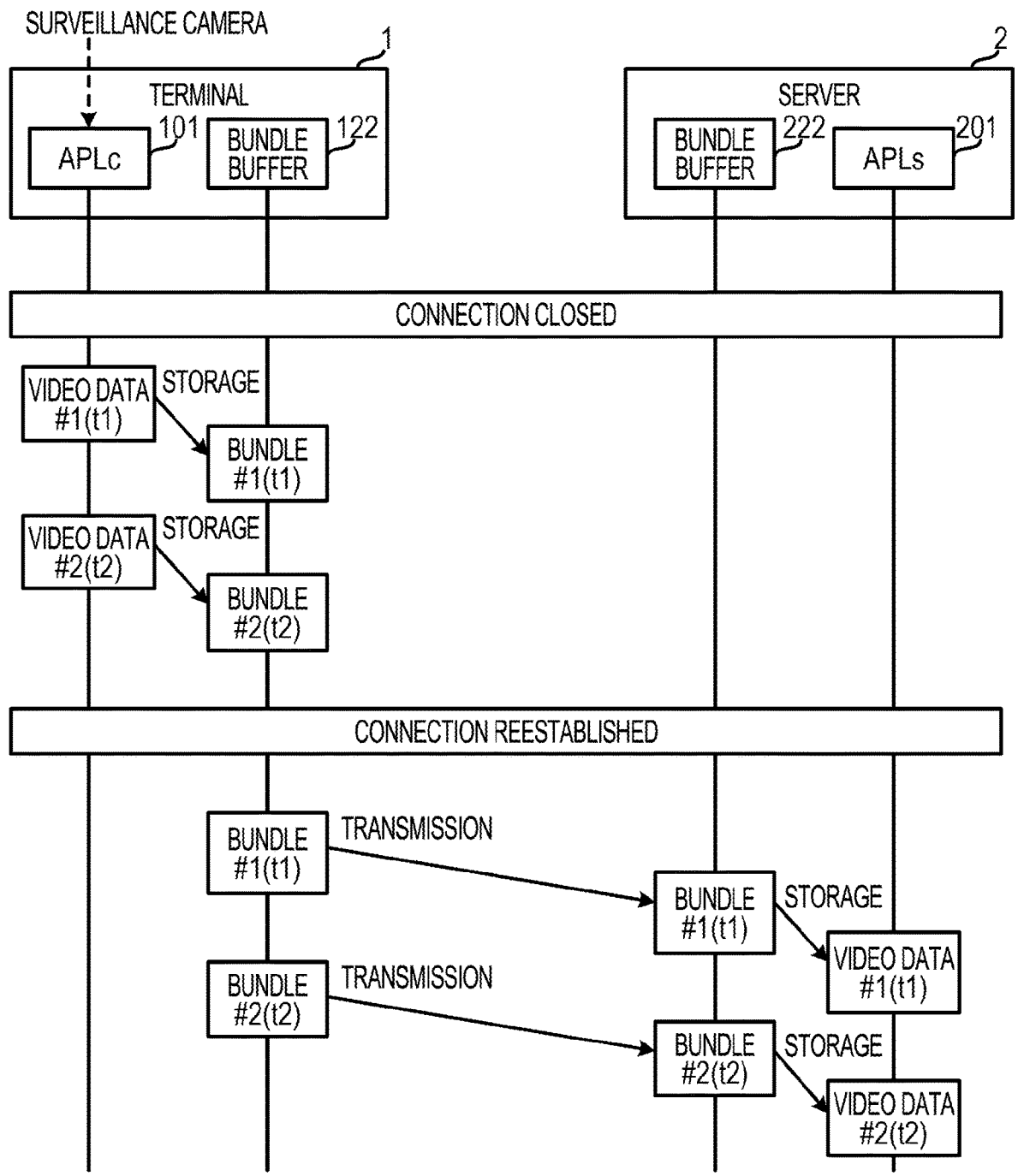
FIG. 13 is a sequence diagram illustrating a comparative example of a video data transmission process.

FIG. 13 is a sequence diagram illustrating a comparative example of a video data transmission process. In this comparative example, in a surveillance camera system, video data #1 at time t1 and video data #2 at time t2 after time t1 are transmitted from the client application 101 to the server application 201 and an export process is not executed.

After the connection between the terminal 1 and the server 2 is closed, the client application 101 of the terminal 1 receives the video data #1 from the surveillance camera. The proxy protocol function unit 110 receives the video data #1 from the client application 101 and requests the bundle control unit 120 to transmit a bundle of the video data #1 (hereinafter referred to as "bundle #1"). The bundle control unit 120 stores the bundle #1 in the bundle buffer 122 because the connection has been closed.

Next, the client application 101 receives the video data #2 from the surveillance camera. A bundle of the video data #2 (hereinafter referred to as "bundle #2") is stored in the bundle buffer 122 by the same process as the video data #1. Thereafter, the connection between the terminal 1 and the server 2 is reestablished.

When the connection is reestablished, the bundle control unit 120 first reads the bundle #1 from the bundle buffer 122 and transmits the bundle #1 to the server 2 and then reads the bundle #2 from the bundle buffer 122 and transmits the bundle #2 to the server 2.

Upon receiving the bundle #1, the bundle control unit 220 of the server 2 stores the bundle #1 in the bundle buffer 122, accommodates the bundle #1 in a proxy message, and outputs the bundle #1 to the proxy protocol function unit 210. The proxy protocol function unit 210 acquires the video data #1 from the proxy message and transmits the video data #1 to the server application 201.

Next, the bundle control unit 220 receives the bundle #2 and stores the bundle #2 in the bundle buffer 222. As with the bundle #1, the proxy protocol function unit 210 acquires the video data #2 from the proxy message and transmits the video data #2 to the server application 201.

In this manner, the server application 201 receives the video data #1 having the earlier time earlier than the video data #2. Therefore, since confirmation of a new video (that is, the video data #2) is delayed in the server 2, which may cause a trouble in the surveillance.

In contrast, the terminal 1 according to the embodiment executes the above-described export process to relay the video data with the earlier time to the server 2 via the relay path Rb different from the video data with the later time.

Figure 14:
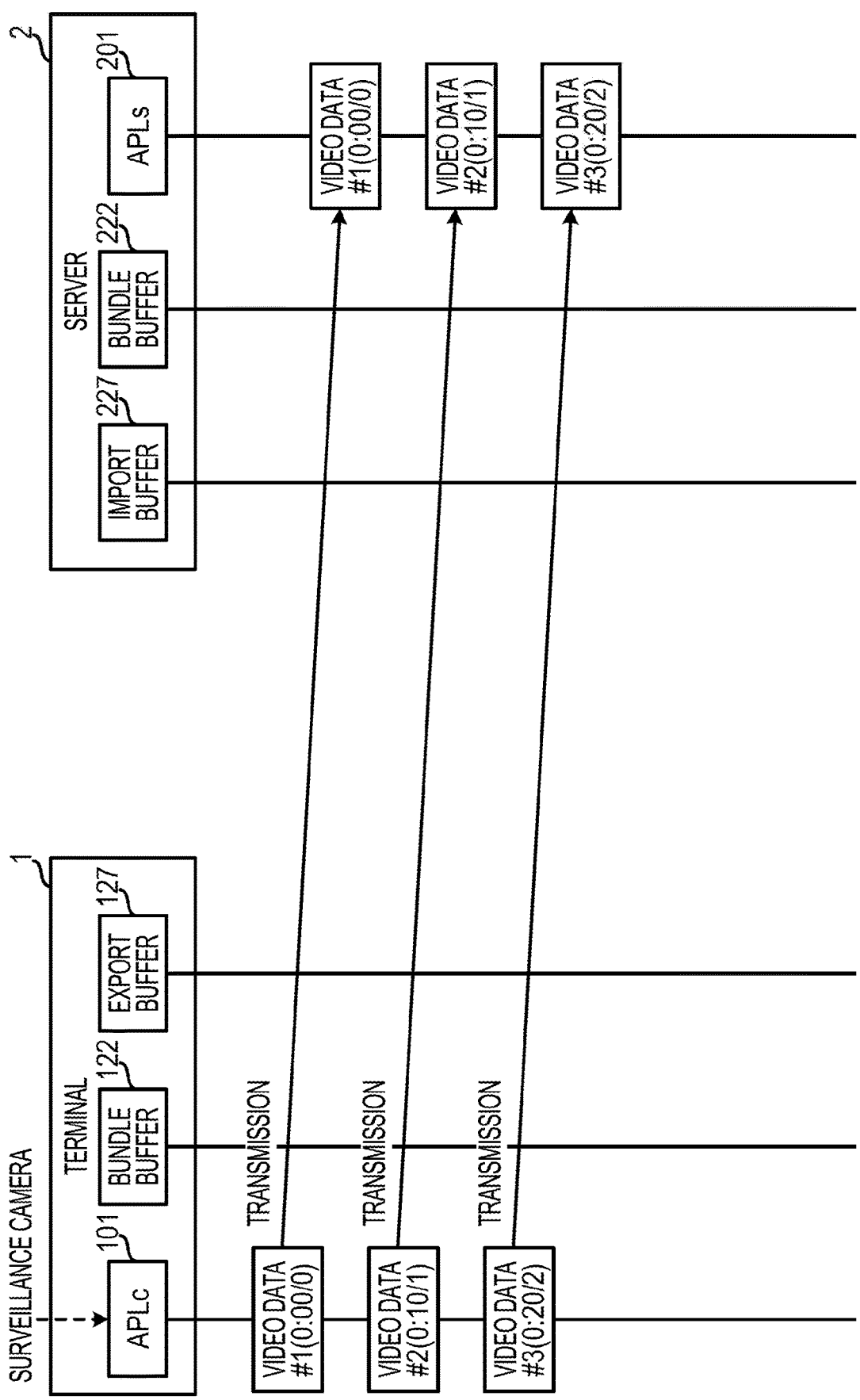
FIG. 14 is a sequence diagram illustrating an example of a video data transmission process in a case where a connection is not closed.

FIG. 14 is a sequence diagram illustrating an example of a video data transmission process in a case where a connection is not closed. Video data #1 to #3 are input from the surveillance camera to the client application 101 in this order.

The video data #1 to #3 are assigned with time information indicating a time at which the videos were generated. The time information of the video data #1 indicates "0:00", the time information of the video data #2 indicates "0:10", and the time information of the video data #3 indicates "0:20".

The client application 101 sets priorities for the video data #1 to #3 according to the order of the time information. Therefore, a priority "0" is set for the video data #1, a priority "1" is set for the video data #2, and a priority "2" is set for the video data #3.

Since the connection between the terminal 1 and the server 2 is not closed, the client application 101 transmits the video data #1 to #3 in this order to the server application 201 by TCP/IP without using the bundle protocol.

Figure 15:
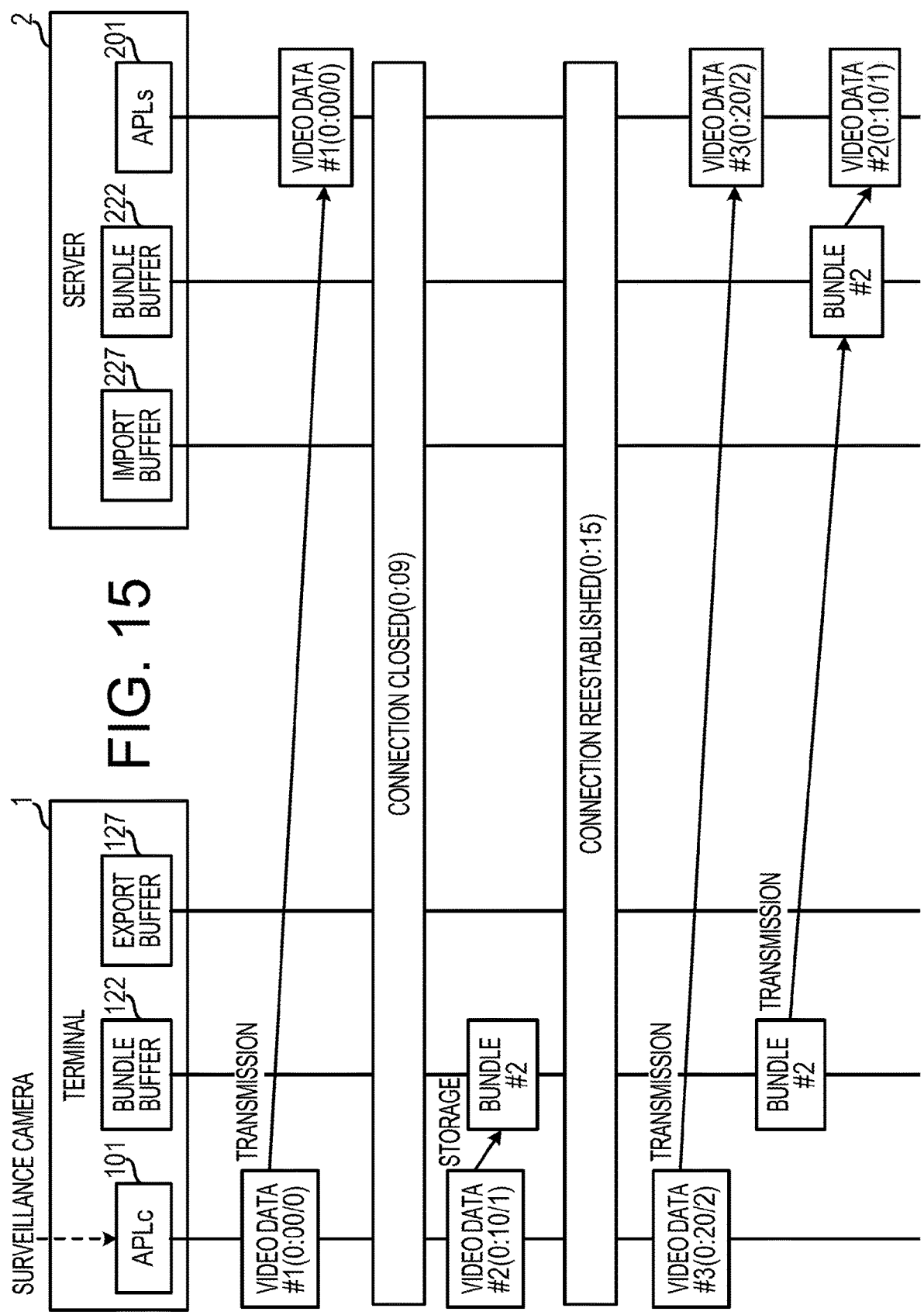
FIG. 15 is a sequence diagram illustrating an example of a video data transmission process when a connection is closed.

FIG. 15 is a sequence diagram illustrating an example of the video data transmission process in a case where the connection is closed. In this example, the connection between the terminal 1 and the server 2 is closed at a time "0:09" and is reestablished at a time "0:15". In the following examples, it is assumed that the sizes of the bundles #1 to #3 accommodating the video data #1 to #3 are smaller than the predetermined value Sth.

Upon receiving the video data #1, the client application 101 transmits the video data #1 to the server application 201 by TCP/IP without using the bundle protocol since the connection between the terminal 1 and the server 2 is not closed. After close of the connection, the client application 101 receives the video data #2 from the surveillance camera. The bundle control unit 120 stores in the bundle buffer 122 the bundle #2 accommodating the video data #2 according to the process of step St17.

The client application 101 receives the video data #3 from the surveillance camera after the connection is reestablished, and transmits the video data #3 to the server application 201 by TCP/IP without using the bundle protocol. Next, since the connection is in an established state (Yes in step St19), the bundle control unit 120 reads the bundle #2 from the bundle buffer 122 and transmits the bundle #2 to the server 2 (step St15). The bundle #2 is stored in the bundle buffer 222 of the server 2 and the server application 201 acquires the video data #2 from the bundle #2.

In this example, since only the video data #2 out of the video data #1 to #3 is stored in the bundle buffer 122, the export process is not executed.

Figure 16:
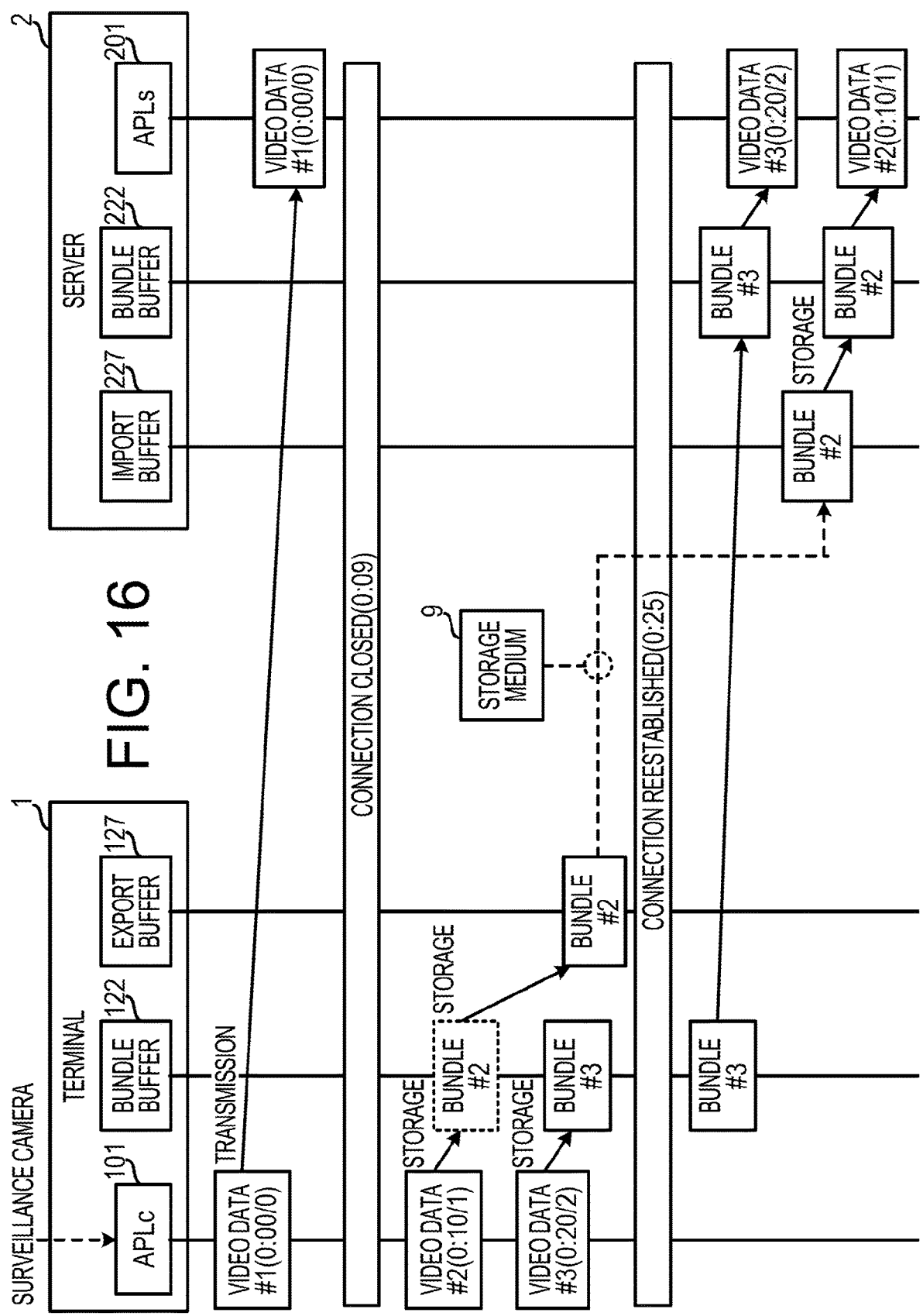
FIG. 16 is a sequence diagram illustrating another example of the video data transmission process when the connection is closed.

FIG. 16 is a sequence diagram illustrating another example of the video data transmission process when the connection is closed. In this example, the connection between the terminal 1 and the server 2 is closed at a time "0:09" and is reestablished at a time "0:25".

Upon receiving the video data #1, the client application 101 transmits the video data #1 to the server application 201 by TCP/IP without using the bundle protocol since the connection between the terminal 1 and the server 2 is not closed. After close of the connection, the client application 101 receives the video data #2 from the surveillance camera. The bundle control unit 120 stores in the bundle buffer 122 the bundle #2 accommodating the video data #2 according to the process of step St17.

Next, the client application 101 receives the video data #3 from the surveillance camera. The bundle control unit 120 stores in the bundle buffer 122 the bundle #3 accommodating the video data #3 according to the process of step St17.

When the video data #3 is received from the client application 101, the relay path determination unit 124 compares the priorities of the video data #2 and the video data #3 according to the process of step St20. That is, when the video data #3 is received, the relay path determination unit 124 determines the magnitude of the priority with respect to the bundle #2 and the bundle #3 stored in the bundle buffer 122.

Since the priority "2" of the new video data #3 is higher than the priority "1" of the old video data #2, the relay path determination unit 124 keeps the bundle #3 stored in the bundle buffer 122 and instructs the export processing unit 125 to export the bundle #2 according to the process of step St20a. The export processing unit 125 reads the instructed bundle #2 from the bundle buffer 122 and stores the instructed bundle #2 in the export buffer 127 according to the process of step St64.

After the connection is reestablished, the bundle control unit 120 reads the bundle #3 from the bundle buffer 122 and transmits the bundle #3 to the server 2. The bundle #3 is stored in the bundle buffer 222 of the server 2 and the server application 201 acquires the video data #3 from the bundle #3.

The bundle #2 in the export buffer 127 is written in the storage medium 9 at an arbitrary timing under the control of the USB-IF 18. In addition, the bundle #2 is written in the import buffer 227 at an arbitrary timing under the control of the USB-IF 18 of the server 2. Upon detecting the bundle #2 in the import buffer 227, the import processing unit 225 stores the bundle #2 in the bundle buffer 222. The server application 201 acquires the video data #2 from the bundle #2.

In this way, the terminal 1 relays the old video data #2 to the server 2 via the relay path Rb according to the export process and relays the new video data #3 to the server 2 via the relay path Ra according to the bundle protocol. As a result, the terminal 1 can transmit the new video data #3 preferentially without discarding the old video data #2.

In addition, the terminal 1 relays a bundle of a larger size to the server 2 via the relay path Rb according to the export process and relays a bundle of a smaller size to the server 2 via the relay path Ra according to the bundle protocol.

Figure 17:
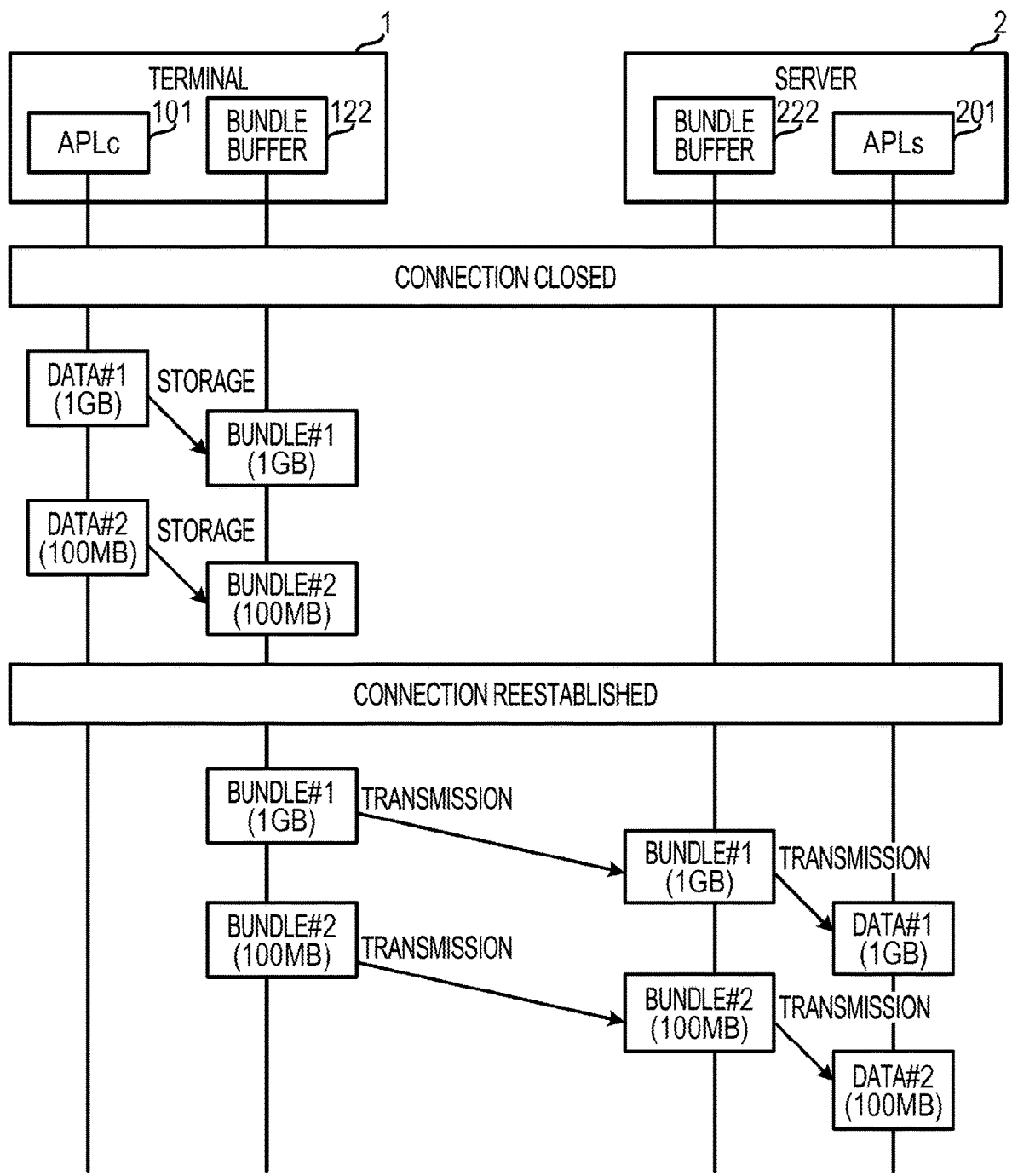
FIG. 17 is a sequence diagram illustrating a comparative example of a transmission process of data having different sizes.

FIG. 17 is a sequence diagram illustrating a comparative example of a transmission process of data having different sizes. In this example, the client application 101 transmits data #1 of one (Gbyte) and data #2 of 100 (Mbyte) to the server 2. The bundle control unit 120 of the comparative example does not execute the bundle size determination process (step St13). The data #1 is accommodated in the bundle #1 and the data #2 is accommodated in the bundle #2.

After close of the connection between the terminal 1 and the server 2, the client application 101 outputs the data #1 to the proxy protocol function unit 110. The bundle control unit 120 acquires the data #1 from the proxy message of the proxy protocol function unit 110, generates the bundle #1 and stores the bundle #1 in the bundle buffer 122.

Next, the client application 101 outputs the data #2 to the proxy protocol function unit 110. The bundle control unit 120 acquires the data #2 from the proxy message of the proxy protocol function unit 110, generates the bundle #2 and stores the bundle #2 in the bundle buffer 122.

After reconnection of the connection, the bundle control unit 120 reads the bundle #1 from the bundle buffer 122 and transmits the bundle #1 to the server 2. The bundle #1 is stored in the bundle buffer 222 of the server 2 and the server application 201 acquires the data #1 from the bundle #1.

Next, the bundle control unit 120 reads the bundle #2 from the bundle buffer 122 and transmits the bundle #2 to the server 2. The bundle #2 is stored in the bundle buffer 222 of the server 2 and the server application 201 acquires the data #2 from the bundle #2.

In this way, the terminal 1 transmits the data #1 of a larger size to the server 2 earlier than the data #2 of a smaller size. There is a possibility that the transmission of the data #2 of a smaller size may be delayed due to the transmission of the data #1 of a larger size.

Therefore, when the data #1 and #2 are received from the client application 101, the relay path determination unit 124 determines the relay paths Ra and Rb based on the sizes of the data #1 and #2. More specifically, the relay path determination unit 124 compares the sizes of the bundles #1 and #2 with the predetermined value Sth and determines the relay paths Ra and Rb based on a result of the comparison.

FIG. 18 is a sequence diagram illustrating an example of a transmission process of data having different sizes. In this example, the client application 101 outputs the data #1 and the data #2 to the proxy protocol function unit 110, as in the comparative example. It is here assumed that the predetermined value Sth is 500 (Mbyte) as an example.

Since one (Gbyte), which is the size of the bundle #1, is greater than or equal to Sth, the relay path determination unit 124 instructs the export processing unit 125 to export the bundle #1. The export processing unit 125 reads the bundle #1 from the bundle buffer 122 and stores the bundle #1 in the export buffer 127. The bundle #1 is written in the storage medium 9 at an arbitrary timing under the control of the USB-IF 18 and is written from the storage medium 9 in the import buffer 227 under the control of the USB-IF 26 of the server 2.

The import processing unit 225 reads the bundle #1 from the import buffer 227 and stores the bundle #1 in the bundle buffer 222. The server application 201 acquires the data #1 from the bundle #1.

In addition, since 100 (Mbyte), which is the size of the bundle #2, is smaller than Sth, the relay path determination unit 124 keeps the bundle #2 stored in the bundle buffer 122. After reconnection of the connection, the bundle control unit 120 reads the bundle #2 from the bundle buffer 122 and transmits the bundle #2 to the server 2. The bundle #2 is stored in the bundle buffer 222 of the server 2 and the server application 201 acquires the data #2 from the bundle #2.

In this way, the terminal 1 relays the data #1 of a larger size to the server 2 via the relay path Rb different from the data #2 of a smaller size. Therefore, it is possible to prevent the transmission of the data #2 of a smaller size from being delayed due to the transmission of the data #1 of a larger size.

The above-described processing functions can be implemented by a computer. In that case, a program describing the processing contents of functions to be possessed by the processing apparatus is provided. By executing the program by a computer, the processing functions are implemented on the computer. The program describing the processing contents can be recorded in a computer readable recording medium (except a carrier wave).

In a case of distributing the program, for example, it is sold in the form of a portable recording medium such as a DVD (Digital Versatile Disc), a CD-ROM (Compact Disc Read Only Memory) and the like in which the program is recorded. Further, the program may be stored in a storage device of a server computer and may be transferred from the server computer to another computer via a network.

The computer that executes the program stores in its own storage device the program recorded in the portable recording medium or the program transferred from the server computer. Then, the computer reads the program from its own storage device and executes a process according to the read program. In addition, the computer may read the program directly from the portable recording medium and execute a process according to the read program. Further, each time a program is transferred from the server computer, the computer may execute a process according to the sequentially received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay communication method, comprising:
receiving, by a computer, data from an application;
determining, by the computer, whether a data remaining amount to be relayed to a communication destination in response to receiving of new data of the application is larger than a predetermined amount, the predetermined amount being set in advance according to an allowable amount of delay of the data at a time of relaying to the communication destination; and
when the data remaining amount is larger than the predetermined amount, determining, by the computer, a relay path of each of a plurality of data received from the application according to a protocol of a disruption tolerant network based on a priority of each of the plurality of data,
wherein the priority is set based on time information that is assigned to each of the plurality of data received from the application and indicates a time at which each of the plurality of data is generated,
when the data remaining amount is larger than the predetermined amount and when the priority of the new data among the plurality of data received from the application is higher than the priority of other data, the method further comprising storing, by the computer, the other data in a storage area corresponding to a communication interface different from the new data, when the data remaining amount is larger than the predetermined amount and when the priority of the new data among the plurality of data received from the application is higher than the priority of the other data, the method further comprising assigning, by the computer, information related to the relaying process to the other data.

2. The relay communication method according to claim 1, wherein, when the data remaining amount is larger than the predetermined amount and when the priority of the new data among the plurality of data received from the application is lower than the priority of the other data, the method further comprising storing, by the computer, the new data in a storage area corresponding to a communication interface different from the other data.

3. The relay communication method according to claim 2, wherein, when the data remaining amount is larger than the predetermined amount and when the priority of the new data among the plurality of data received from the application is lower than the priority of the other data, the method further comprising assigning, by the computer, information related to the relaying process to the new data.

4. The relay communication method according to claim 1, wherein, when the new data is received from the application, the method further comprising determining, by the computer, a relay path according to a protocol of a disruption tolerance network of the new data based on the size of the new data.

5. A non-transitory computer-readable recording medium having stored therein a relay communication program that causes a computer to execute a process, the process comprising:

receiving data from an application;

determining whether a data remaining amount to be relayed to a communication destination in response to receiving of new data of the application is larger than a predetermined amount, the predetermined amount being set in advance according to an allowable amount of delay of the data at a time of relaying to the communication destination; and when the data remaining amount is larger than the predetermined amount, determining a relay path of each of a plurality of data received from the application according to a protocol of a disruption tolerant network based on a priority of each of the plurality of data, wherein the priority is set based on time information that is assigned to each of the plurality of data received from the application and indicates a time at which each of the plurality of data is generated, when the data remaining amount is larger than the predetermined amount and when the priority of the new data among the plurality of data received from the application is higher than the priority of other data, the process further comprising storing the other data in a storage area corresponding to a communication interface different from the new data, when the data remaining amount is larger than the predetermined amount and when the priority of the new data among the plurality of data received from the application is higher than the priority of the other data, the process further comprising assigning information related to the relaying process to the other data.

6. The non-transitory computer-readable recording medium according to claim 5, wherein, when the data remaining amount is larger than the predetermined amount and when the priority of the new data among the plurality of data received from the application is lower than the priority of other data, the process further comprising storing the new data in a storage area corresponding to a communication interface different from the other data.

7. The non-transitory computer-readable recording medium according to claim 6, wherein, when the data remaining amount is larger than the predetermined amount and when the priority of the new data among the plurality of data received from the application is lower than the priority of the other data, the process further comprising assigning information related to the relaying process to the new data.

8. The non-transitory computer-readable recording medium according to claim 5, wherein, when the new data is received from the application, the process further comprising determining a relay path according to a protocol of a disruption tolerance network of the new data based on the size of the new data.

9. A relay communication device, comprising:

a memory; and a processor coupled to the memory and the processor configured to:

receive data from an application;

determine whether a data remaining amount to be relayed to a communication destination in response to receiving of new data of the application is larger than a predetermined amount, the predetermined amount being set in advance according to an allowable amount of delay of the data at a time of relaying to the communication destination; and when the data remaining amount is larger than the predetermined amount, determine a relay path of each of a plurality of data received from the application according to a protocol of a disruption tolerant network based on a priority of each of the plurality of data, wherein the priority is set based on time information that is assigned to each of the plurality of data received from the application and indicates a time at which each of the plurality of data is generated, when the data remaining amount is larger than the predetermined amount and when the priority of the new data among the plurality of data received from the application is higher than the priority of other data, store the other data in a storage area corresponding to a communication interface different from the new data, when the data remaining amount is larger than the predetermined amount and when the priority of the new data among the plurality of data received from the application is higher than the priority of the other data, assign information related to the relaying process to the other data.

10. The relay communication device according to claim 9, wherein the processor is further configured to:

store the new data in a storage area corresponding to a communication interface different from the other data when the data remaining amount is larger than the predetermined amount and when the priority of the new data among the plurality of data received from the application is lower than the priority of the other data.

11. The relay communication device according to claim 10, wherein, when the data remaining amount is larger than the predetermined amount and when the priority of the new data among the plurality of data received from the application is lower than the priority of the other data, the processor assigns information related to the relaying process to the new data.

* * * * *